(12) United States Patent  
Hattori et al.

(10) Patent No.: US 7,608,199 B2  
(45) Date of Patent: Oct. 27, 2009

(54) LIQUID CRYSTAL COMPOSITION AND LIQUID CRYSTAL DISPLAY ELEMENT

(75) Inventors: Norikatsu Hattori, Chiba (JP); Hitoshi Yamamoto, Nagano (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 955 days.

(21) Appl. No.: 11/108,002

(22) Filed: Apr. 14, 2005

(65) Prior Publication Data

US 2005/0230661 A1    Oct. 20, 2005

(30) Foreign Application Priority Data

Apr. 14, 2004    (JP)    ............................... 2004-119144

(51) Int. Cl.
  *C09K 19/00*    (2006.01)
  *C09K 19/52*    (2006.01)
(52) U.S. Cl. ............................... 252/299.01; 252/299.6; 252/299.63; 252/299.66; 428/1.1; 428/1.2; 430/20
(58) Field of Classification Search ............ 252/299.63, 252/299.66, 299.6, 299.01; 428/1.1, 1.2; 430/20
See application file for complete search history.

(56) References Cited

U.S. PATENT DOCUMENTS 6,576,303 B1    6/2003   Tamura et al.

*Primary Examiner*—Geraldina Visconti  
(74) *Attorney, Agent, or Firm*—Hogan & Hartson LLP

(57) ABSTRACT

A liquid crystal composition with a negative dielectric anisotropy includes at least one compound selected from the group of compounds represented by the following formula (1) as a first component, and at least one compound selected from the group of compounds represented by the following formulas (2-1) to (2-3) and (3-1) to (3-4) as a second component.

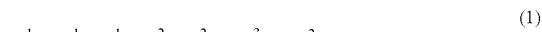
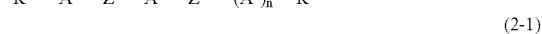
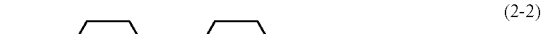
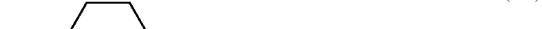
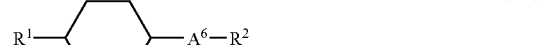
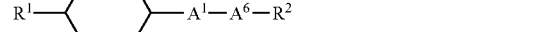
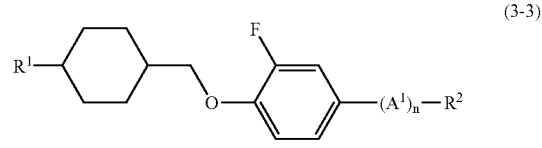
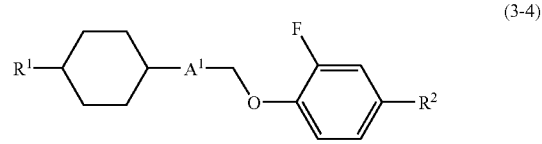

25 Claims, No Drawings

LIQUID CRYSTAL COMPOSITION AND LIQUID CRYSTAL DISPLAY ELEMENT

BACKGROUND OF THE INVENTION

1. Filed of the Invention

The present invention relates mainly to a liquid crystal composition suitable for active matrix (AM) elements, and an AM element including the composition.

2. Related Art

Liquid crystal display elements are classified by liquid crystal operating modes into phase change (PC), twisted nematic (TN), super twisted nematic (STN), electrically controlled birefringence (ECB), optically compensated bend (OCB), in-plane switching (IPS), and vertical alignment (VA) elements, and so forth. The liquid crystal display elements are classified also by driving modes into passive matrix (PM) and active matrix (AM) elements. The PM elements are further classified into static and multiplex elements, and so forth, and the AM elements are further classified into thin film transistor (TFT) and metal insulator metal (MIM) elements, and so forth. The TFTs are classified into amorphous silicons, polycrystal silicons, and continuous grain silicons, and the polycrystal silicons are further classified by production processes into high temperature type silicons and low temperature type silicons. Further, the liquid crystal display elements are classified based on light sources into reflection type elements utilizing a natural light, transmission type elements utilizing a backlight, and semi-transmission type elements utilizing both the natural light and the backlight.

These elements include a liquid crystal composition having suitable characteristics. The general characteristics of the composition should be improved to obtain an AM element having excellent general characteristics. Table 1 below summarizes relationships of the general characteristics between the composition and the AM element. The general characteristics of the composition will be explained further in terms of a commercially available AM element. The nematic phase temperature range of the composition relates to the temperature range in which the element can be used. The higher limit temperature of the nematic phase temperature range is preferably 70° C. or more, and the lower limit temperature is preferably −20° C. or less. The viscosity of the composition relates to the response time of the element. It is preferred that the element has a short response time to display a moving image. Accordingly, the composition preferably has a small viscosity, and more preferably has a small viscosity at a low temperature.

TABLE 1

General characteristics of a liquid crystal composition and an AM element

| No | General characteristics of a composition | General characteristics of an AM Element |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Threshold voltage is low | Electric power consumption is small and a contrast ratio is large |
| 5 | Specific resistance is large | Voltage holding ratio is small and a contrast ratio is large |

[1]A liquid crystal composition can be injected into a cell in a short time.

The optical anisotropy of the composition relates to the contrast ratio of the element. An element of a VA or IPS mode, etc. utilizes an electrically controlled birefringence. Thus, to maximize the contrast ratio of the VA mode element, a product (Δn·d) of the optical anisotropy (Δn) of the composition and the cell gap (d) of the element is designed to be uniform. For example, the product is 0.30 to 0.35 μm in the VA mode and 0.20 to 0.30 μm in the IPS mode. The cell gap (d) is generally 3 to 6 μm, so that the optical anisotropy of the composition is generally within the range of 0.05 to 0.11. A large dielectric anisotropy of the composition contributes to a small driving voltage of the element. Thus, the composition preferably has a large dielectric anisotropy. A composition having a positive dielectric anisotropy is used for common AM elements, while a composition having a negative dielectric anisotropy is used for VA-mode AM elements. A large specific resistance of the composition contributes to a large voltage holding ratio and a large contrast ratio of the element. Accordingly, the composition preferably has a large specific resistance initially, and further preferably has a large specific resistance even after it has been used for a long time.

A composition having a negative dielectric anisotropy contains a compound having a negative dielectric anisotropy. For example, as such a compound, a 2-difluoromethyl-3-fluoro-1,4-phenylene-containing compound having a negative dielectric anisotropy is described in Patent Document 1, etc.

Patent Document 1: WO 2000-39063 A (U.S. Pat. No. 6,576,303 B1)

SUMMARY OF THE INVENTION

The present invention has a liquid crystal composition with a negative dielectric anisotropy, comprising at least one compound selected from the group of compounds represented by the following formula (1) as a first component, and at least one compound selected from the group of compounds represented by the following formulas (2-1) to (2-3) and (3-1) to (3-4) as a second component:

$$R^1-A^1-Z^1-A^2-Z^2-(A^3)_n-R^2 \quad (1)$$

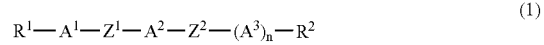
(2-1)

(2-2)

(2-3)

(3-1)

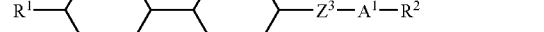
(3-2)

-continued

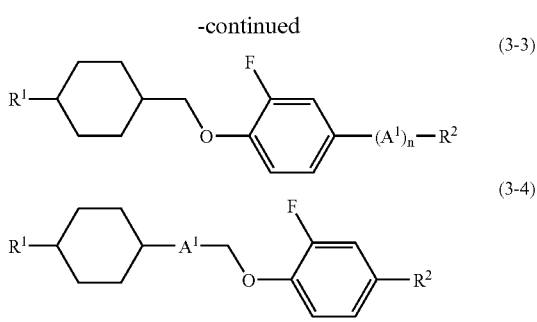

wherein $R^1$ is alkyl or alkenyl; $R^2$ is alkyl, alkenyl, or alkoxy; $R^3$ is alkyl, alkenyl, alkoxy, or —COO—$R^4$, in which $R^4$ is alkyl; $R^5$ is alkyl, alkenyl, alkoxy, or alkoxymethyl; $Z^1$ and $Z^2$ are independently a single bond, —CH$_2$O—, —OCH$_2$—, —(CH$_2$)$_2$—, —(CH$_2$)$_4$—, —CF$_2$O—, —OCF$_2$—, —C$_2$H$_4$CF$_2$O—, —C$_2$H$_4$OCF$_2$—, —CF$_2$OC$_2$H$_4$—, or —OCF$_2$C$_2$H$_4$—; $Z^3$ is a single bond or —COO—; $A^1$ is 1,4-cyclohexylene or 1,4-phenylene; $A^2$ and $A^3$ are independently 1,4-cyclohexylene, 1,4-phenylene, 1,4-phenylene in which a hydrogen is replaced by a fluorine, or 2-difluoromethyl-3-fluoro-1,4-phenylene; $A^4$ is 1,4-cyclohexylene, 1,4-phenylene, or 1,4-phenylene in which a hydrogen is replaced by a fluorine; $A^5$ is 1,4-phenylene or 1,4-phenylene in which a hydrogen is replaced by a fluorine; $A^6$ is 2-fluoro-1,4-phenylene; n is 0 or 1; in the formula (1), when n is 0, $A^2$ is 2-difluoromethyl-3-fluoro-1,4-phenylene, and $Z^2$ is a single bond; and in the formula (1), when n is 1, one of $A^2$ and $A^3$ is 2-difluoromethyl-3-fluoro-1,4-phenylene, and one of $Z^1$ and $Z^2$ is a single bond.

The present invention also has a liquid crystal display element including the liquid crystal composition described above.

DETAILED DESCRIPTION

Terms used in the specification and claims are defined as follows: The liquid crystal composition of the present invention and the liquid crystal display element of the invention may occasionally be abbreviated as the composition and the element, respectively. The term "a liquid crystal display element" is a general term for a liquid crystal display panel and a liquid crystal display module. An element driven by an active matrix may be abbreviated as an AM element, an element of a TN mode may be abbreviated as a TN element, and elements of other modes may also be abbreviated in the same manner. The liquid crystal composition includes a liquid crystalline compound. The term "a liquid crystalline compound" is a general term for a compound having a liquid crystal phase such as a nematic phase and a smectic phase, and a compound having no liquid crystal phase and being useful as a component of the composition. The formulas (1) to (1-12) may be collectively abbreviated as the formula (1), and other formulas may be also abbreviated in the same manner. At least one compound selected from a group of compounds represented by the formula (1-1) may be abbreviated as a compound (1-1), and compounds represented by other formulas may also be abbreviated in the same manner.

A higher limit temperature of a nematic phase temperature range may be abbreviated as a higher limit temperature. A lower limit temperature of a nematic phase temperature range may be abbreviated as a lower limit temperature. The term "a composition has a large specific resistance" means that the composition has a large specific resistance at the initial stage and has a large specific resistance even after it has been used for a long time. The term "an element has a large voltage holding ratio" means that the element has a large voltage holding ratio at the initial stage and has a large voltage holding ratio even after it has been used for a long time. Characteristics such as optical anisotropy are explained using values measured by methods described in Examples. The content (percentage) of each component of a composition is described in percentage by weight (% by weight) based on the total weight of the composition.

An advantage of the present invention is to provide a liquid crystal composition, which satisfies two or more of characteristics such as a wide nematic phase temperature range, a small viscosity, a suitable optical anisotropy, a large negative dielectric anisotropy, and a large specific resistance. One aspect of the invention is to provide a liquid crystal composition having properly balanced characteristics. Another aspect of the invention is to provide a liquid crystal display element, which includes such a composition to have a large voltage holding ratio. A further aspect of the invention is to provide an AM element, which includes a composition having characteristics such as a small viscosity, an optical anisotropy of 0.05 to 0.11, and a dielectric anisotropy of −6.5 to −2.0, and is suitable for a VA mode, an IPS mode, etc.

The present invention has the following.

1. A liquid crystal composition with a negative dielectric anisotropy, comprising at least one compound selected from the group of compounds represented by the following formula (1) as a first component, and at least one compound selected from the group of compounds represented by the following formulas (2-1) to (2-3) and (3-1) to (3-4) as a second component:

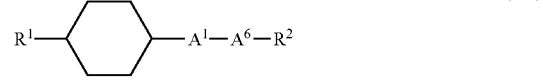

-continued

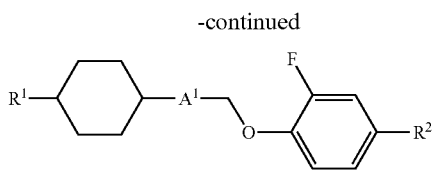
(3-4)

wherein R¹ is alkyl or alkenyl; R² is alkyl, alkenyl, or alkoxy; R³ is alkyl, alkenyl, alkoxy, or —COO—R⁴, in which R⁴ is alkyl; R⁵ is alkyl, alkenyl, alkoxy, or alkoxymethyl; Z¹ and Z² are independently a single bond, —CH₂O—, —OCH₂—, —(CH₂)₂—, —(CH₂)₄—, —CF₂O—, —OCF₂—, —C₂H₄CF₂O—, —C₂H₄OCF₂—, —CF₂OC₂H₄—, or —OCF₂C₂H₄—; Z³ is a single bond or —COO—; A¹ is 1,4-cyclohexylene or 1,4-phenylene; A² and A³ are independently 1,4-cyclohexylene, 1,4-phenylene, 1,4-phenylene in which any hydrogen may be replaced by fluorine, or 2-difluoromethyl-3-fluoro-1,4-phenylene; A⁴ is 1,4-cyclohexylene, 1,4-phenylene, or 1,4-phenylene in which a hydrogen is replaced by a fluorine; A⁵ is 1,4-phenylene or 1,4-phenylene in which a hydrogen is replaced by a fluorine; A⁶ is 2-fluoro-1,4-phenylene; n is 0 or 1; in the formula (1), when n is 0, A² is 2-difluoromethyl-3-fluoro-1,4-phenylene, and Z² is a single bond; and in the formula (1), when n is 1, one of A² and A³ is 2-difluoromethyl-3-fluoro-1,4-phenylene, and one of Z¹ and Z² is a single bond.

2. The liquid crystal composition according to item 1, wherein, in the formula (1), Z¹ is a single bond, A¹ is 1,4-cyclohexylene, A² is 2-difluoromethyl-3-fluoro-1,4-phenylene, and n is 0.

3. The liquid crystal composition according to item 1, wherein, in the formula (1), Z¹ is a single bond or —CH₂O—, A¹ and A² are 1,4-cyclohexylene, and A³ is 2-difluoromethyl-3-fluoro-1,4-phenylene.

4. The liquid crystal composition according to item 1, wherein the first component is at least one compound selected from the group of compounds represented by the following formulas (1-1) to (1-12):

 (1-1)

 (1-2)

 (1-3)

 (1-4)

 (1-5)

 (1-6)

 (1-7)

 (1-8)

 (1-9)

 (1-10)

 (1-11)

 (1-12)

wherein R¹ is alkyl or alkenyl; R² is alkyl, alkenyl, or alkoxy; Z⁴ is a single bond, —CH₂O—, or —OCH₂—; Z⁵ is —(CH₂)₂— or —(CH₂)₄—; Z⁶ is —CF₂O—, —OCF₂—, —C₂H₄CF₂O—, —C₂H₄OCF₂—, —CF₂OC₂H₄—, or —OCF₂C₂H₄—; A¹ is 1,4-cyclohexylene or 1,4-phenylene; A⁷ is 1,4-phenylene in which a hydrogen is replaced by a fluorine, or 2-difluoromethyl-3-fluoro-1,4-phenylene; A⁸ is 1,4-cyclohexylene, 1,4-phenylene, 1,4-phenylene in which a hydrogen is replaced by a fluorine, or 2-difluoromethyl-3-fluoro-1,4-phenylene; one of A⁷ and A⁸ is 2-difluoromethyl-3-fluoro-1,4-phenylene; n is 0 or 1; and in the formulas (1-1) to (1-3), when n is 0, A⁷ is 2-difluoromethyl-3-fluoro-1,4-phenylene.

5. The liquid crystal composition according to item 4, wherein the first component is at least one compound selected from the group of the compounds represented by the formulas (1-1), (1-3), (1-4), (1-6), (1-7), (1-9), (1-10), and (1-12).

6. The liquid crystal composition according to item 4, wherein, in the formula (1-1), Z⁴ is a single bond, A¹ is 1,4-cyclohexylene, A⁷ is 2-difluoromethyl-3-fluoro-1,4-phenylene, and n is 0.

7. The liquid crystal composition according to item 4, wherein, in the formulas (1-4), (1-7), and (1-10), Z⁴ is a single bond or —CH₂O—, A¹ and A⁸ are 1,4-cyclohexylene, and A⁷ is 2-difluoromethyl-3-fluoro-1,4-phenylene.

8. The liquid crystal composition according to any one of items 1 to 7, wherein the second component is at least one compound selected from the group of the compounds represented by the formulas (2-1) to (2-3).

9. The liquid crystal composition according to any one of items 1 to 7, wherein the second component is at least one compound selected from the group of the compounds represented by the formula (2-1).

10. The liquid crystal composition according to any one of items 1 to 7, wherein the second component is at least one compound selected from the group of the compounds represented by the formula (2-2).

11. The liquid crystal composition according to any one of items 1 to 7, wherein the second component is at least one compound selected from the group of the compounds represented by the formula (2-3).

12. The liquid crystal composition according to any one of items 1 to 7, wherein the second component is at least one compound selected from the group of the compounds represented by the formulas (3-1) to (3-4).

13. The liquid crystal composition according to any one of items 1 to 7, wherein the second component is at least one compound selected from the group of compounds represented by the following formulas (2-1-1), (2-1-2), (2-1-3), (2-1-4), (2-1-5), (2-2-1), (2-2-2), (2-3-1), (2-3-2), (2-3-3), and (2-3-4):

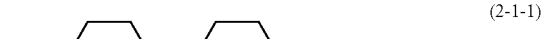 (2-1-1)

 (2-1-2)

 (2-1-3)

 (2-1-4)

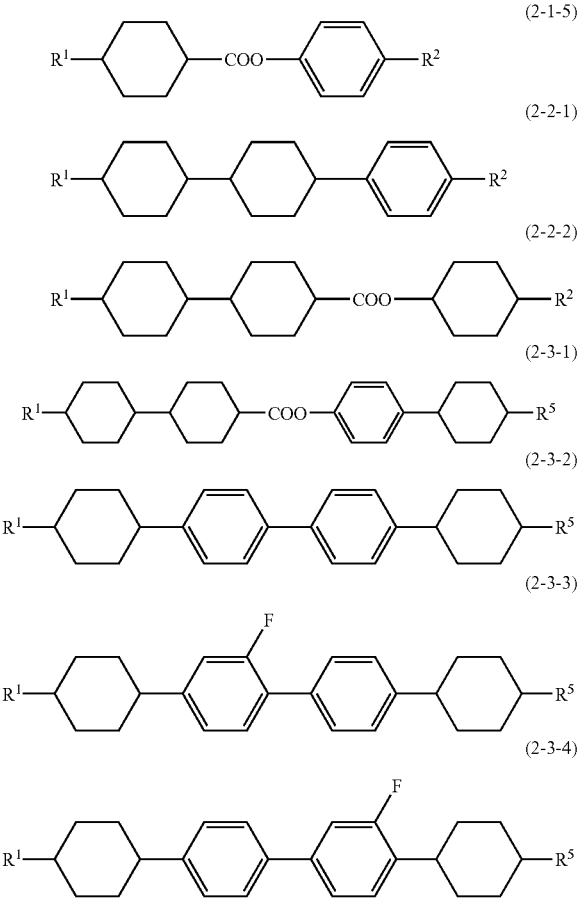

wherein $R^1$ is alkyl or alkenyl; $R^2$ is alkyl, alkenyl, or alkoxy; $R^4$ is alkyl; and $R^5$ is alkyl, alkenyl, alkoxy, or alkoxymethyl.

14. The liquid crystal composition according to item 13, wherein the second component is a compound selected from the group of the compounds represented by the formulas (2-1-1), (2-1-4), (2-2-1), and (2-3-1).

15. The liquid crystal composition according to any one of items 1 to 14, wherein the liquid crystal composition comprises 5 to 90% by weight of the first component and 5 to 90% by weight of the second component based on the total weight of the composition.

16. The liquid crystal composition according to any one of items 1 to 15, further comprising at least one compound selected from the group of compounds represented by the following formula (4) as a third component:

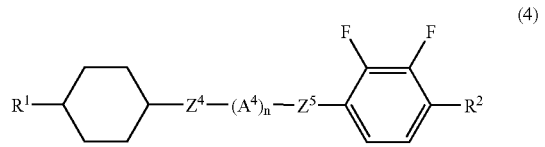

wherein $R^1$ is alkyl or alkenyl; $R^2$ is alkyl, alkenyl, or alkoxy; $Z^4$ and $Z^5$ are independently —$CF_2O$— or —$OCF_2$—; $A^4$ is 1,4-cyclohexylene, 1,4-phenylene, or 1,4-phenylene in which a hydrogen is replaced by a fluorine; and n is 0 or 1.

17. The liquid crystal composition according to item 16, wherein the liquid crystal composition comprises 2 to 50% by weight of the third component based on the total weight of the composition.

18. The liquid crystal composition according to any one of items 1 to 17, wherein the liquid crystal composition has a dielectric anisotropy of −6.5 to −2.0.

19. A liquid crystal display element comprising the liquid crystal composition according to any one of items 1 to 18.

20. The liquid crystal display element according to item 19, wherein the liquid crystal display element uses a VA or IPS mode, and is driven by an active matrix.

21. A method of using the liquid crystal composition according to any one of items 1 to 18 for a liquid crystal display element that uses a VA or IPS mode and is driven by an active matrix.

The composition of the present invention satisfies two or more of characteristics such as a wide nematic phase temperature range, a small viscosity, a suitable optical anisotropy, a large negative dielectric anisotropy, and a large specific resistance. The liquid crystal composition has properly balanced characteristics. The element of the invention includes the composition, and has a large voltage holding ratio. The element is suitable for an AM element using a VA mode, an IPS mode, etc. because it includes a composition having characteristics such as a small viscosity, an optical anisotropy of 0.05 to 0.11, and a dielectric anisotropy of −6.5 to −2.0.

The composition of the invention will be explained in the following order. First, the constitution of components in the composition will be explained. Second, the main characteristics of the component compounds and the main effects of the compounds on the composition will be explained. Third, a suitable ratio of the component compounds and its basis will be explained. Fourth, a desirable embodiment of the component compounds will be explained. Fifth, concrete examples of the component compounds will be shown. Last, the synthesis methods of the component compounds will be explained.

First, the constitution of components in the composition will be explained. There are 44 combinations of the compounds (1) to (4). The combinations are summarized in Tables 2 to 5 as Types 1 to 44. In Tables 2 to 5, each circle means that the corresponding compound is used as a component of the composition, and each blank means that the corresponding compound is not used as a component. For example, in the case of Type 1, the compounds (1) and (2-1) are used as components contained in the composition.

TABLE 2

| | Combination examples of compounds (1) | | | |
|---|---|---|---|---|
| | Compound (1) | Compound (2-1) | Compound (2-2) | Compound (2-3) |
| Type 1 | O | O | | |
| Type 2 | O | | O | |
| Type 3 | O | | | O |
| Type 4 | O | O | O | |
| Type 5 | O | O | | O |
| Type 6 | O | | O | O |
| Type 7 | O | O | O | O |

TABLE 3

Combination examples of compounds (2)

| | Compound (1) | Compound (2-1) | Compound (2-2) | Compound (2-3) | Compound (4) |
|---|---|---|---|---|---|
| Type 8  | O | O |   |   | O |
| Type 9  | O |   | O |   | O |
| Type 10 | O |   |   | O | O |
| Type 11 | O | O | O |   | O |
| Type 12 | O | O |   | O | O |
| Type 13 | O |   | O | O | O |
| Type 14 | O | O | O | O | O |

TABLE 4

Combination examples of compounds (3)

| | Compound (1) | Compound (3-1) | Compound (3-2) | Compound (3-3) | Compound (3-4) |
|---|---|---|---|---|---|
| Type 15 | O | O |   |   |   |
| Type 16 | O |   | O |   |   |
| Type 17 | O |   |   | O |   |
| Type 18 | O |   |   |   | O |
| Type 19 | O | O | O |   |   |
| Type 20 | O | O |   | O |   |
| Type 21 | O | O |   |   | O |
| Type 22 | O |   | O | O |   |
| Type 23 | O |   | O |   | O |
| Type 24 | O |   |   | O | O |
| Type 25 | O | O | O | O |   |
| Type 26 | O | O | O |   | O |
| Type 27 | O | O |   | O | O |
| Type 28 | O |   | O | O | O |
| Type 29 | O | O | O | O | O |

TABLE 5

Combination examples of compounds (4)

| | Compound (1) | Compound (3-1) | Compound (3-2) | Compound (3-3) | Compound (3-4) | Compound (4) |
|---|---|---|---|---|---|---|
| Type 30 | O | O |   |   |   | O |
| Type 31 | O |   | O |   |   | O |
| Type 32 | O |   |   | O |   | O |
| Type 33 | O |   |   |   | O | O |
| Type 34 | O | O | O |   |   | O |
| Type 35 | O | O |   | O |   | O |
| Type 36 | O | O |   |   | O | O |
| Type 37 | O |   | O | O |   | O |
| Type 38 | O |   | O |   | O | O |
| Type 39 | O |   |   | O | O | O |
| Type 40 | O | O | O | O |   | O |
| Type 41 | O | O | O |   | O | O |
| Type 42 | O | O |   | O | O | O |
| Type 43 | O |   | O | O | O | O |
| Type 44 | O | O | O | O | O | O |

At least one compound selected from the compounds (1-1) to (1-12) is used as the first component. In this case, the term "the compound (1-1)" means a single compound or a plurality of compounds, and this rule is applicable to the compounds represented by other formulas. Preferred first components include the compounds (1-1), (1-3), (1-4), (1-6), (1-7), (1-9), (1-10), and (1-12). At least one compound selected from the group of the compounds (2-1) to (2-3) and (3-1) to (3-4) is used as the second component. Preferred second components include the compounds (2-1), (2-2), and (2-3).

The composition of the invention is classified into a composition A or a composition B. The composition A may further include another compound such as a liquid crystalline compound, an additive, and an impurity. This liquid crystalline compound is different from the compounds (1) to (3). The liquid crystalline compound is added to the composition to control the characteristics. Examples of the additives include optically active compounds, coloring matters, ultraviolet absorbers, and antioxidants. The optically active compound is added to the composition to induce a helical liquid crystal structure, thereby providing a twist angle. The coloring matter is added to the composition to adapt the composition to an element of a guest host (GH) mode. The impurity is a compound mixed in a process such as synthesis of each component and preparation of the composition, and so forth.

The composition B essentially consists of the compounds selected from the compounds (1) to (3). The term "essentially" means that the composition B does not include a liquid crystalline compound other than the compounds (1) to (3), may further include an additive, an impurity, and so forth, and may further include a compound contained therein such as an impurity, an optically active compound, a coloring matter, an ultraviolet absorber, and an antioxidant. The composition B includes fewer components in comparison with the composition A. The composition B is preferable to the composition A from the viewpoint of costs. The composition A is preferable to the composition B because the physical properties of the composition can be further improved by mixing another liquid crystalline compound.

Examples of the ultraviolet absorbers include benzophenones, benzoates, and triazoles. Specific examples of the benzophenones include 2-hydroxy-4-octoxybenzophenone. Specific examples of the benzoates include 2,4-di-tert-butylphenyl 3,5-di-tert-butyl-4-hydroxybenzoate. Specific examples of the triazoles include 2-(2-hydroxy-5-methylphenyl)benzotriazole, 2-[2-hydroxy-3-(3,4,5,6-tetrahydroxyphthalimidomethyl)-5-methylphenyl]benzotriazole, and 2-(3-tert-butyl-2-hydroxy-5-methylphenyl)-5-chlorobenzotriazole.

Examples of the antioxidants include phenols and organic sulfur compounds. Specific examples of the phenols include 3,5-di-tert-butyl-4-hydroxytoluene, 2,2'-methylene bis(6-tert-butyl-4-methylphenol), 4,4'-butylidene bis(6-tert-butyl-3-methylphenol), 2,6-di-tert-butyl-4-(2-octadecyloxycarbonyl)ethylphenol, and pentaerythritol tetrakis[3-(3,5-di-tert-butyl-4-hydroxyphenyl)propionate]. Specific examples of the organic sulfur compounds include dilauryl 3,3'-thiopropionate, dimyristyl 3,3'-thiopropionate, distearyl 3,3'-thiopropionate, pentaerythritol tetrakis(3-laurylthiopropionate), and 2-mercaptobenzimidazole.

It is preferred that the additive such as the ultraviolet absorber and the antioxidant is used in a large amount to attain the purpose. However, an excessively large amount of the additive is not preferred in view of the general characteristics of the composition. Though a large amount of the antioxidant can prevent reduction of the specific resistance in the step of heating the composition, an excessively large amount of the antioxidant is likely to reduce the higher limit temperature of the composition. For example, the content of the ultraviolet absorber or the antioxidant may be 10 to 500 ppm based on the total weight of the composition. The content is preferably 30 to 300 ppm, more preferably 40 to 200 ppm.

Second, the main characteristics of the component compounds and the main effects of the compounds on the composition will be explained. The main characteristics of the compounds are summarized in Tables 6 and 7. In Tables 6 and 7, L means large or high, M means middle, and S means small or low. The numbers 0 mean that the dielectric anisotropy is nearly zero or very small. The letters L, M, and S are relative evaluation results in these compounds.

TABLE 6

Characteristics of compounds (1)

|  | (1) n = 0 | (1) n = 1 | (2-1) | (2-2) | (2-3) |
|---|---|---|---|---|---|
| Higher limit temperature | S | M | S | M | L |
| Viscosity | M | L | S | S | M |
| Optical anisotropy | M | M | S-M | M | M-L |
| Dielectric anisotropy | M[1] | L[1] | O | O | O |
| Specific resistance | L | L | L | L | L |

[1] The compound has a negative dielectric anisotropy.

TABLE 7

Characteristics of compounds (2)

|  | (3-1) | (3-2) | (3-3) n = 0 | (3-3) n = 1 | (3-4) | (4) n = 0 | (4) n = 1 |
|---|---|---|---|---|---|---|---|
| Higher limit temperature | S | L | S | M-L | M | S | M-L |
| Viscosity | M | M | M | M-L | M | M | M-L |
| Optical anisotropy | M | M-L | M | L | M | M | M-L |
| Dielectric anisotropy | S[1] | S[1] | S[1] | S-M[1] | S[1] | M[1] | L[1] |
| Specific resistance | L | L | L | L | L | L | L |

[1] The compound has a negative dielectric anisotropy.

Third, a suitable ratio of the components and its basis will be explained. The first component is the compound (1). The content of the first component is preferably at least 5% in view of negatively increasing the dielectric anisotropy or decreasing the threshold voltage, and is preferably at most 90% in view of decreasing the lower limit temperature. The content of the first component is more preferably 30 to 85%. The second component is one of the compounds (2) and (3). When the second component is the compound (2), the content of the second component is preferably at least 5% in view of decreasing the viscosity, and is preferably at most 90% in view of negatively increasing the dielectric anisotropy or decreasing the threshold voltage. The content of the compound (2) is more preferably 5 to 40%. When the second component is the compound (3), the content of the second component is preferably at least 5% in view of negatively increasing the dielectric anisotropy or decreasing the threshold voltage, and is preferably at most 90% in view of decreasing the lower limit temperature. The content of the compound (3) is more preferably 30 to 85%. The composition may include the compound (4) as the third component in addition to the first and second components. In a case where the composition includes the third component, the content of the third component is preferably at least 2% in view of negatively increasing the dielectric anisotropy or decreasing the threshold voltage, and is preferably at most 50% in view of decreasing the lower limit temperature. The content of the third component is more preferably 20 to 45%.

Fourth, a desirable embodiment of the component compounds will be explained. The symbol $R^1$ is used in a plurality of the formulas for the component compounds. $R^1$'s in the formulas may represent the same or different ones in these-compounds. For example, there is a case that $R^1$ of the compound (1-1) is alkyl and $R^1$ of the compound (2-1) is alkenyl. This rule is also applicable to $R^2$, $R^3$, $R^4$, $R^5$, $A^1$, $A^2$, $A^3$, $A^4$, $A^5$, $A^6$, $Z^1$, $Z^2$, $Z^3$, $Z^4$, and n.

$R^1$ is preferably alkyl having 1 to 10 carbon atoms or alkenyl having 2 to 10 carbon atoms. $R^2$ is preferably alkyl having 1 to 10 carbon atoms, alkenyl having 2 to 10 carbon atoms, or alkoxy having 1 to 10 carbon atoms. $R^3$ is preferably alkyl having 1 to 10 carbon atoms, alkenyl having 2 to 10 carbon atoms, alkoxy having 1 to 10 carbon atoms, or —COO—$R^4$, in which $R^4$ is preferably alkyl having 1 to 10 carbon atoms. $R^5$ is preferably alkyl having 1 to 10 carbon atoms, alkenyl having 2 to 10 carbon atoms, alkoxy having 1 to 10 carbon atoms, or alkoxymethyl having 2 to 10 carbon atoms.

Preferred alkyl includes methyl, ethyl, propyl, butyl, pentyl, hexyl, heptyl, and octyl, and more preferred alkyl includes ethyl, propyl, butyl, pentyl, and heptyl.

Preferred alkenyl includes vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, and 5-hexenyl, and more preferred alkenyl includes vinyl, 1-propenyl, 3-butenyl, and 3-pentenyl. A desirable —CH═CH— configuration of the alkenyl depends on the position of the double bond. Trans configuration is desirable in 1-propenyl, 1-butenyl, 1-pentenyl, 1-hexenyl, 3-pentenyl, 3-hexenyl, etc. Cis configuration is desirable in 2-butenyl, 2-pentenyl, 2-hexenyl, etc.

Preferred alkoxy includes methoxy, ethoxy, propoxy, butoxy, pentyloxy, hexyloxy, and heptyloxy, more preferred alkoxy includes methoxy and ethoxy.

Preferred alkoxymethyl includes methoxymethyl, ethoxymethyl, propoxymethyl, butoxymethyl, and pentyloxymethyl, more preferred alkoxymethyl includes methoxymethyl.

The —COO—$R^4$ group is preferably methoxycarbonyl, ethoxycarbonyl, propoxycarbonyl, or butoxycarbonyl, more preferably methoxycarbonyl.

In the 1,4-cyclohexylene of the component compounds, trans configuration is preferable to cis configuration. The "1,4-phenylene in which a hydrogen is replaced by a fluorine" of $A^2$, $A^3$, $A^4$, $A^5$, $A^7$, or $A^8$ is 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, or 2,3,5,6-tetra-1,4-phenylene. $A^2$, $A^3$, $A^4$, and $A^5$ are preferably 1,4-phenylene, 2-fluoro-1,4-phenylene, 2,3-difluoro-1,4-phenylene, 2,5-difluoro-1,4-phenylene, or 2,6-difluoro-1,4-phenylene, more preferably 2-fluoro-1,4-phenylene, 2,3-difluoro-1,4-phenylene, or 2,6-difluoro-1,4-phenylene, respectively. 3-fluoro-1,4-phenylene is equal to 2-fluoro-1,4-phenylene, and thereby is not described. This rule is applicable to the relation between 2,5-difluoro-1,4-phenylene and 3,6-difluoro-1,4-phenylene, the relation between 2-difluoromethyl-3-fluoro-1,4-phenylene and 3-difluoromethyl-2-fluoro-1,4-phenylene, etc. The compound (1) has 2-difluoromethyl-3-fluoro-1,4-phenylene.

$Z^1$ and $Z^2$ are independently a single bond, —CH$_2$O—, —OCH$_2$—, —(CH$_2$)$_2$—, —(CH$_2$)$_4$—, —CF$_2$O—, —OCF$_2$—, —C$_2$H$_4$CF$_2$O—, —C$_2$H$_4$OCF$_2$—, —CF$_2$OC$_2$H$_4$—, or —OCF$_2$C$_2$H$_4$—. $Z^1$ is preferably a single bond, —CH$_2$O—, or —(CH$_2$)$_2$—. When $Z^1$ is —CH$_2$O—, the formula (1) is not $R^1$-$A^1$-OCH$_2$-$A^2$-$Z^2$-$(A^3)_n$-$R^2$, but $R^1$-$A^1$-CH$_2$O-$A^2$-$Z^2$-$(A^3)_n$-$R^2$. This rule is applicable to $Z^2$, $Z^3$, $Z^4$, $Z^5$, and $Z^6$. $Z^3$ is a single bond or —COO—, preferably a single bond. $Z^4$ is a single bond, —CH$_2$O—, or —OCH$_2$—, preferably a single bond or —CH$_2$O—. $Z^5$ is —(CH$_2$)$_2$— or —(CH$_2$)$_4$—, preferably —(CH$_2$)$_2$—. $Z^6$ is —CF$_2$O—, —OCF$_2$—, —C$_2$H$_4$CF$_2$O—, —C$_2$H$_4$OCF$_2$—, —CF$_2$OC$_2$H$_4$—, or —OCF$_2$C$_2$H$_4$—, preferably —OCF$_2$C$_2$H$_4$—, —C$_2$H$_4$CF$_2$O—, or —CF$_2$O—.

Fifth, concrete examples of the component compounds will be shown. Preferred compounds (1-1) include compounds (1-1-1) to (1-1-10). Preferred compounds (1-2) include compounds (1-2-1) to (1-2-6). Preferred compounds (1-3) include compounds (1-3-1) to (1-3-18). Preferred compounds (1-4) include compounds (1-4-1) to (1-4-9). Preferred compounds (1-5) include compounds (1-5-1) to (1-5-6). Preferred compounds (1-6) include compounds (1-6-1) to (1-6-18). Preferred compounds (1-7) include compounds (1-7-1) to (1-7-6). Preferred compounds (1-8) include compounds (1-8-1) to (1-8-6). Preferred compounds (1-9) include compounds (1-9-1) to (1-9-18). Preferred compounds (1-10) include compounds (1-10-1) to (1-10-4). Preferred compounds (1-11) include compounds (1-11-1) to (1-11-4). Preferred compounds (1-12) include compounds (1-12-1) to (1-12-12). More preferred compounds (1) include compounds (1-1-1) to (1-1-10), (1-3-1) to (1-3-18), (1-4-1) to (1-4-9), (1-6-1) to (1-6-18), (1-7-1) to (1-7-6), (1-9-1) to (1-9-18), (1-10-1) to (1-10-4), and (1-12-1) to (1-12-12). Particularly preferred compounds (1) include compounds (1-1-1), (1-4-1), and (1-7-1).

Preferred compounds (2-1) include compounds (2-1-1) to (2-1-5). Preferred compounds (2-2) include compounds (2-2-1) to (2-2-2). Preferred compounds (2-3) include compounds (2-3-1) to (2-3-4). More preferred compounds (2) include compounds (2-1-1) to (2-1-5), (2-2-1), (2-2-2), and (2-3-1) to (2-3-4). Particularly preferred compounds (2) include compounds (2-1-1), (2-1-4), (2-2-1), and (2-3-1).

Preferred compounds (3-1) include compounds (3-1-1) to (3-1-2). Preferred compounds (3-2) include compounds (3-2-1) to (3-2-4). Preferred compounds (3-3) include compounds (3-3-1) to (3-3-3). Preferred compounds (3-4) include compounds (3-4-1) to (3-4-2). More preferred compounds (3) include compounds (3-1-1), (3-1-2), (3-2-1) to (3-2-4), (3-3-1) to (3-3-3), (3-4-1), and (3-4-2).

Preferred compounds (4) include compounds (4-1) to (4-28). In the exemplified compounds and the preferred compounds, the groups $R^1$'s, etc. may be the same or different ones as described above.

$R^1$ is alkyl or alkenyl, preferably alkyl having 1 to 10 carbon atoms or alkenyl having 2 to 10 carbon atoms. $R^2$ is alkyl, alkenyl, or alkoxy, preferably alkyl having 1 to 10 carbon atoms, alkenyl having 2 to 10 carbon atoms, or alkoxy having 1 to 10 carbon atoms. $R^4$ is alkyl, preferably alkyl having 1 to 10 carbon atoms. $R^5$ is alkyl, alkenyl, alkoxy, or alkoxymethyl, preferably alkyl having 1 to 10 carbon atoms, alkenyl having 2 to 10 carbon atoms, alkoxy having 1 to 10 carbon atoms, or alkoxymethyl having 2 to 10 carbon atoms. One of $Y^1$ and $Y^2$ is fluorine, and the other is —CF$_2$H. $Y^3$ and $Y^4$ are independently hydrogen, fluorine, or —CF$_2$H, and at least one of $Y^3$ and $Y^4$ is not —CF$_2$H. $Y^5$ and $Y^6$ are independently hydrogen or fluorine. Preferred alkyl, alkenyl, alkoxy, and alkoxymethyl, and more preferred alkyl, alkenyl, alkoxy, and alkoxymethyl are as described above. Preferred —CH═CH— configuration of the alkenyl is as described above. In the 1,4-cyclohexylene of these preferable compounds, trans configuration is preferable to cis configuration.

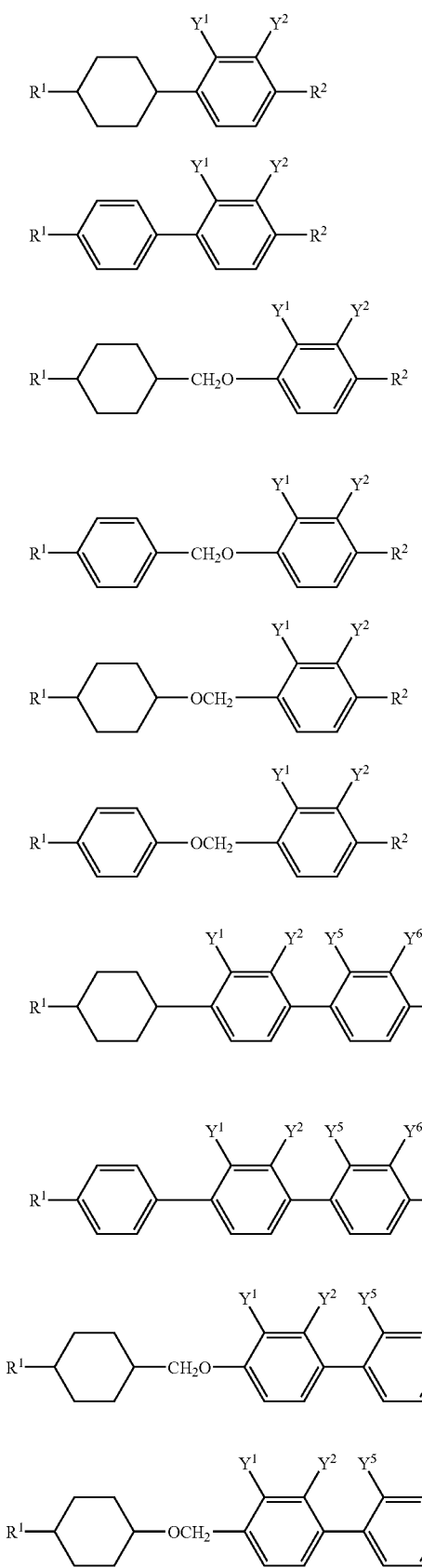
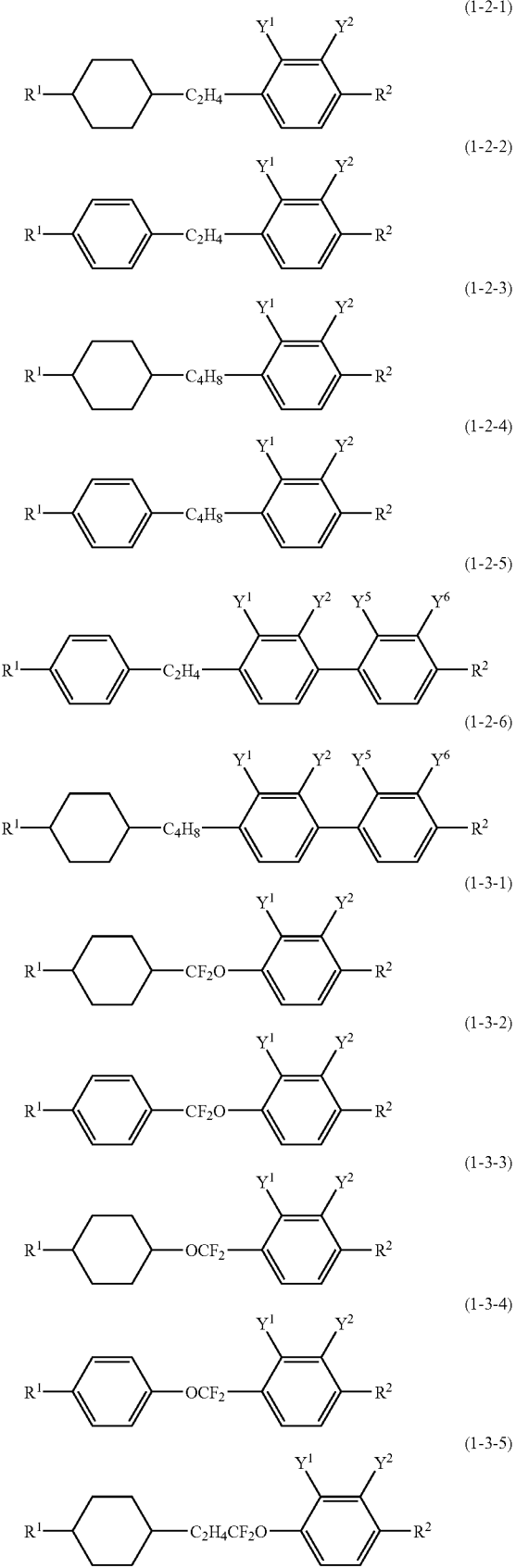

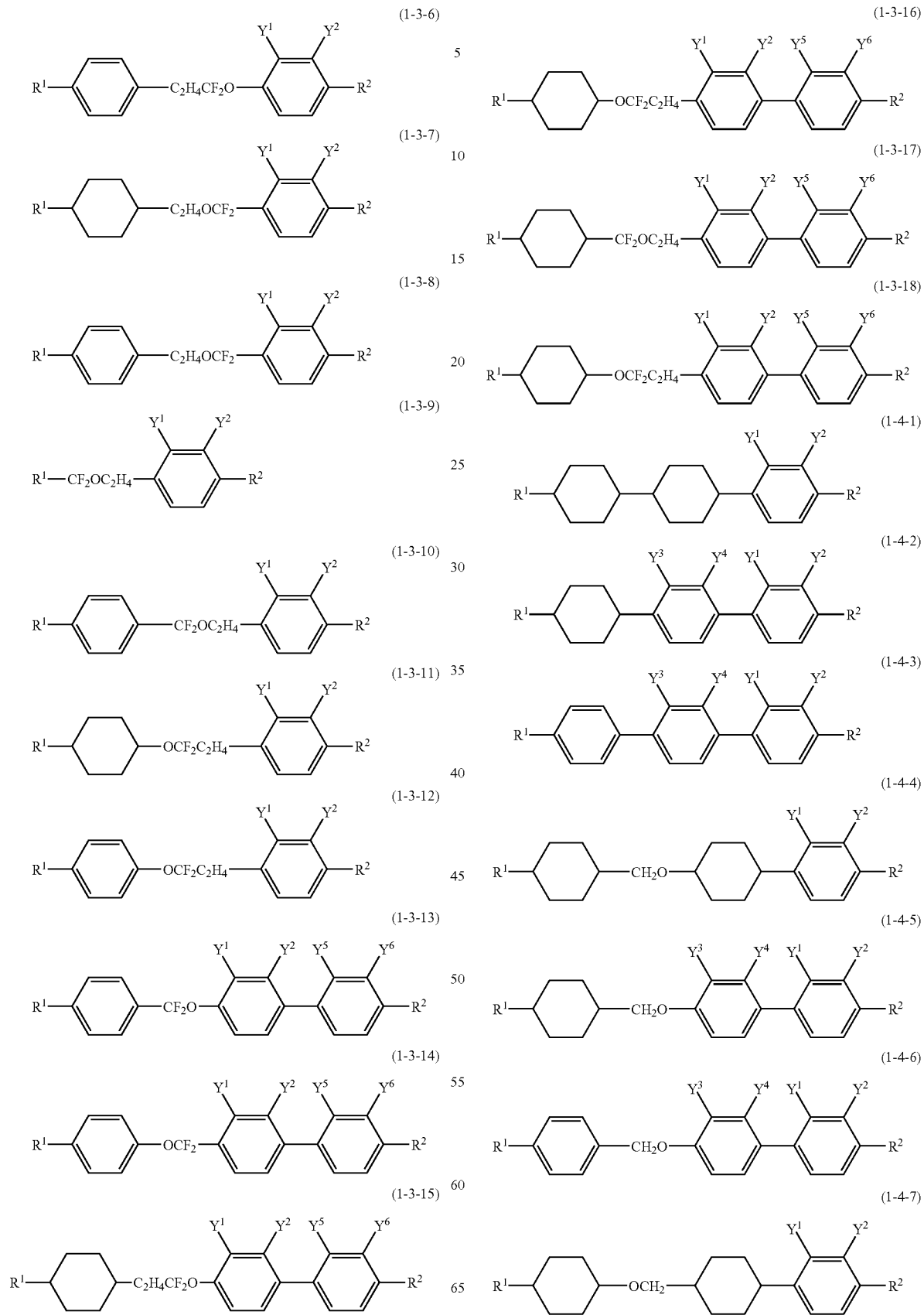

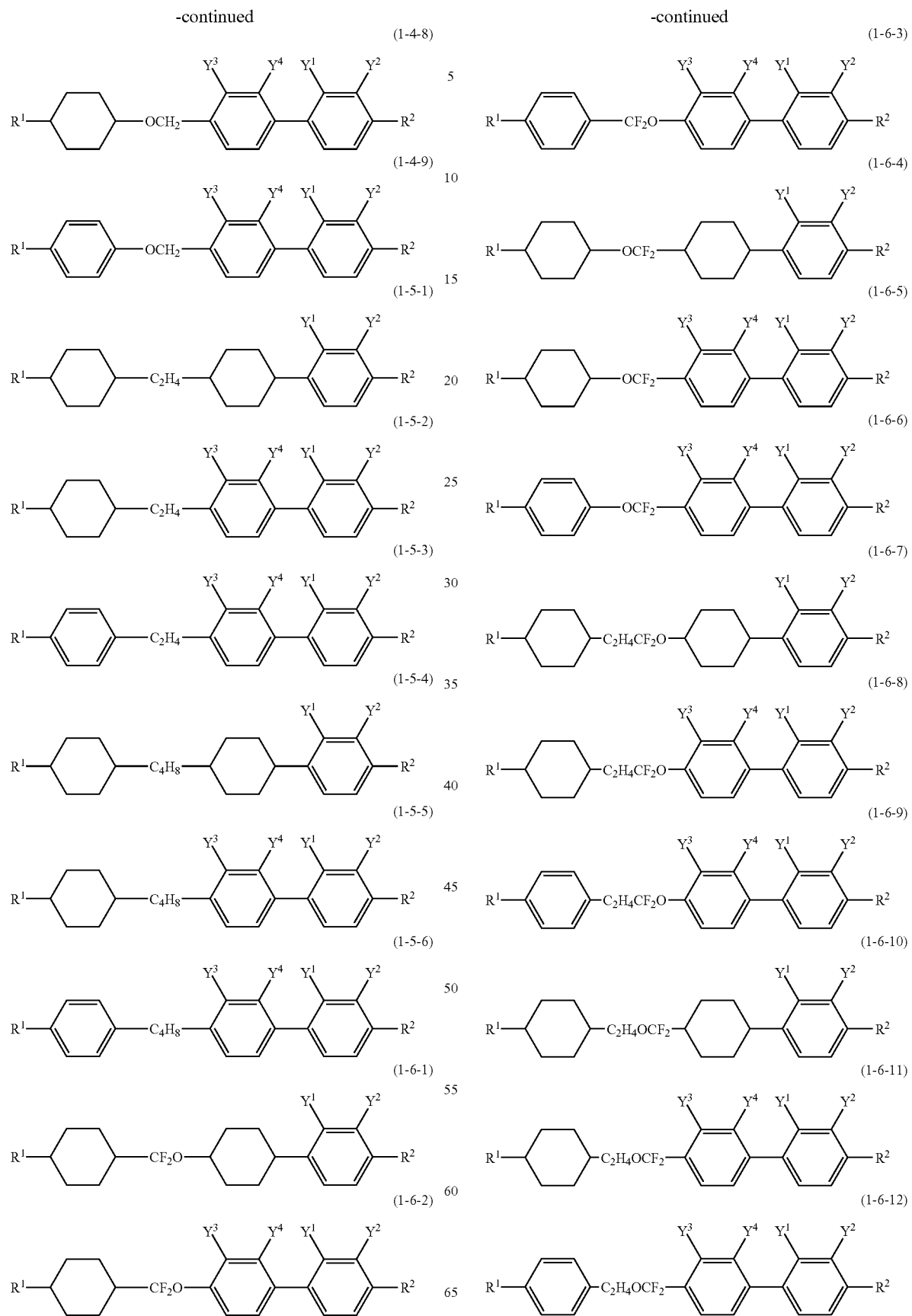

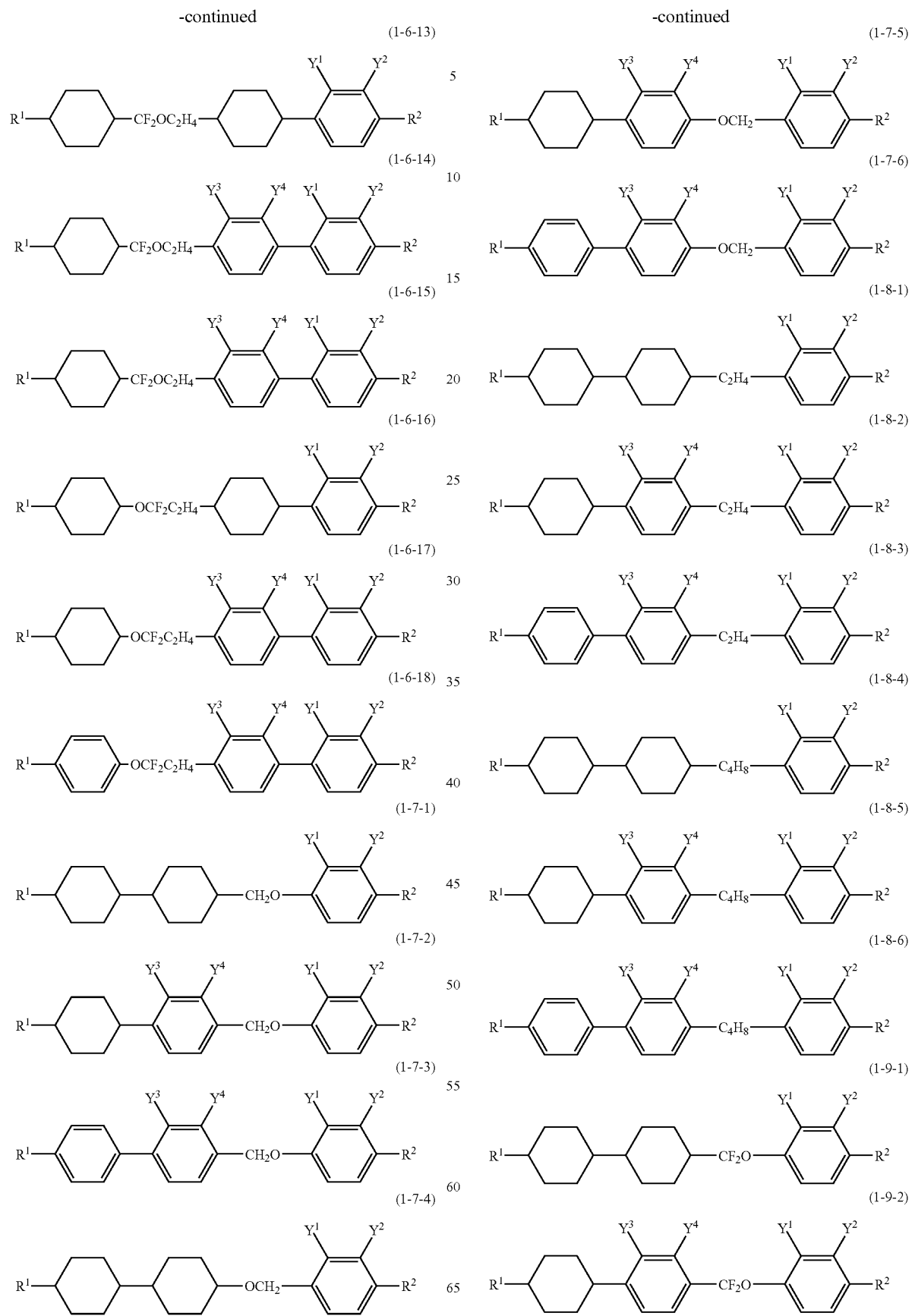

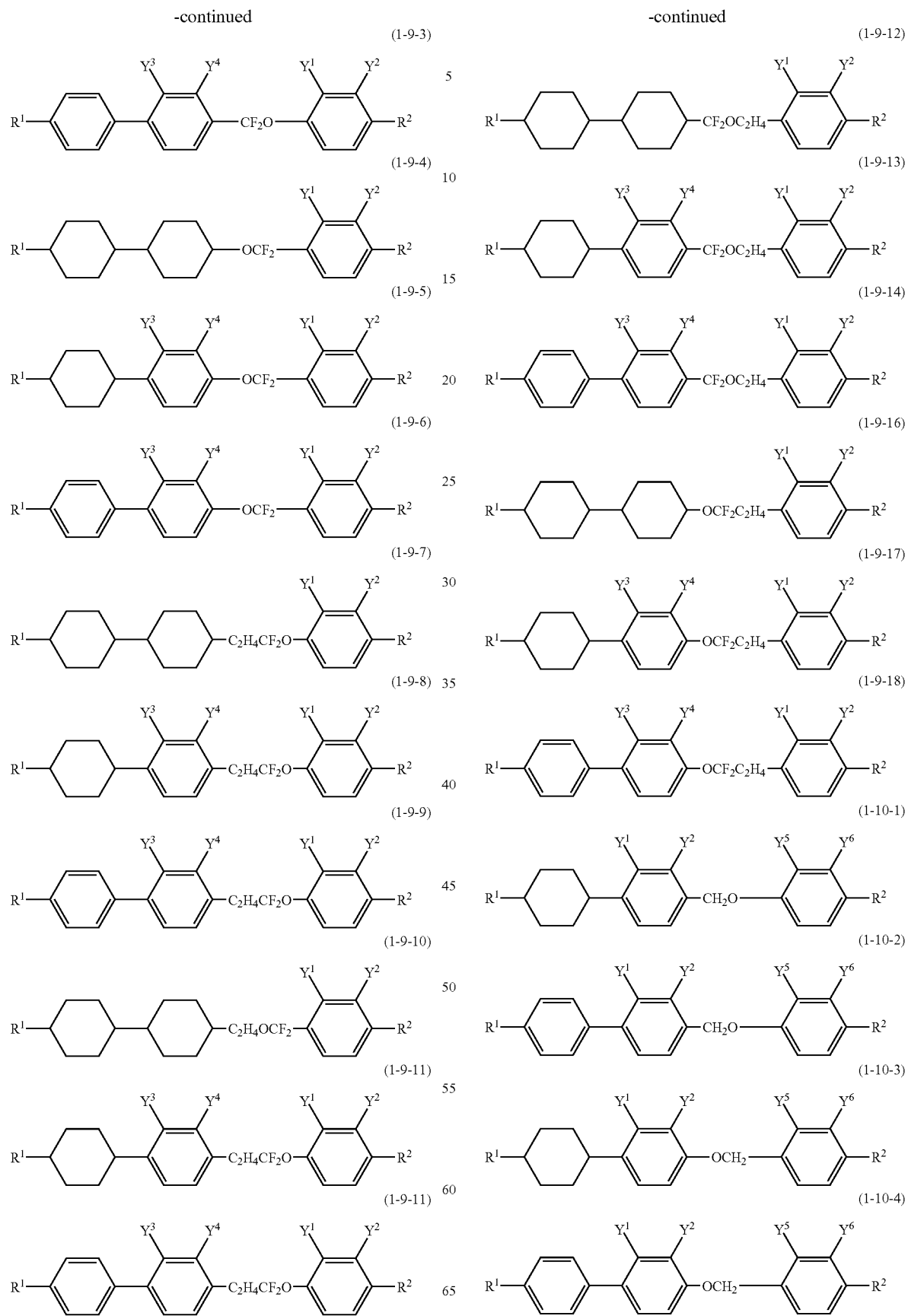

(1-11-1) 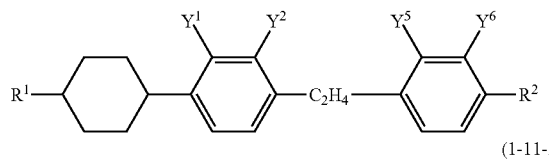
(1-11-2) 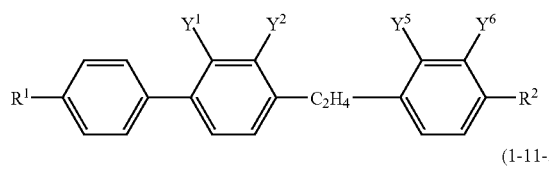
(1-11-3) 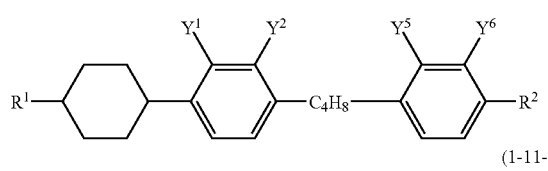
(1-11-4) 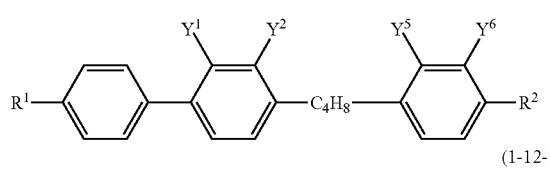
(1-12-1) 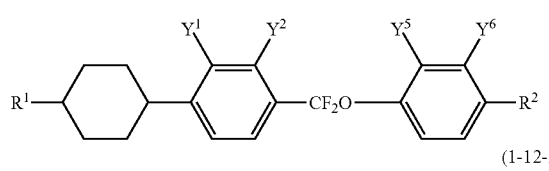
(1-12-2) 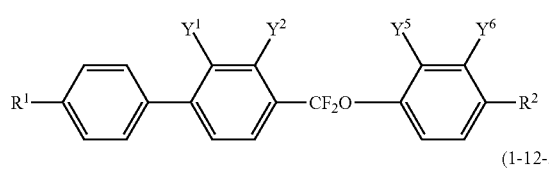
(1-12-3) 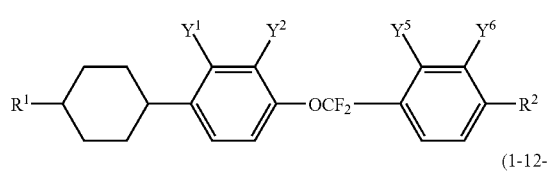
(1-12-4) 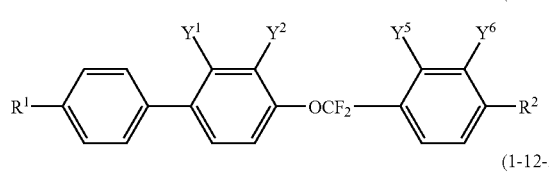
(1-12-5) 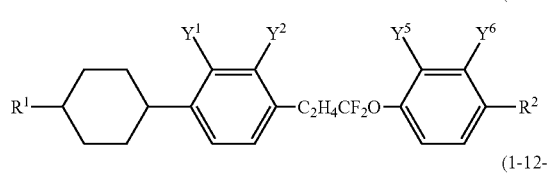
(1-12-6) 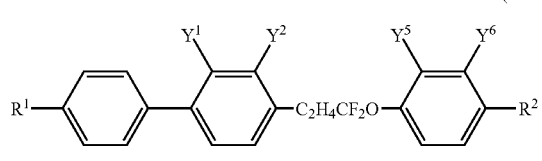
(1-12-7) 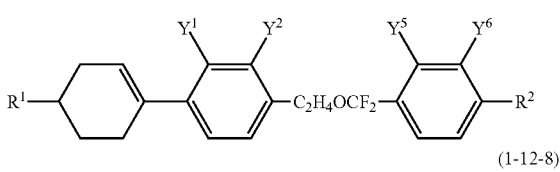
(1-12-8) 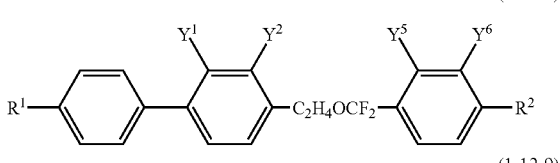
(1-12-9) 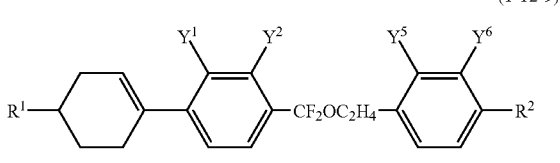
(1-12-10) 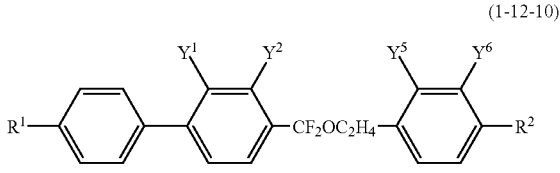
(1-12-11) 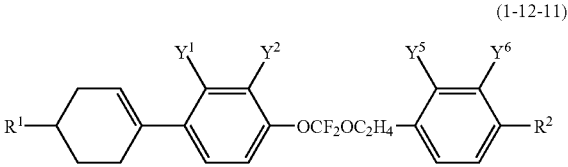
(1-12-12) 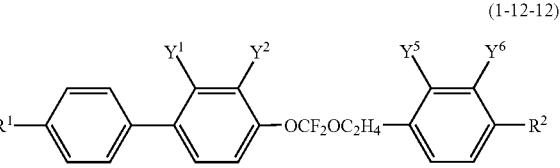
(2-1-1) 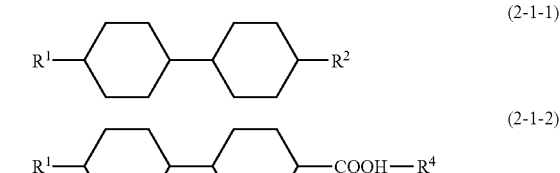
(2-1-2) 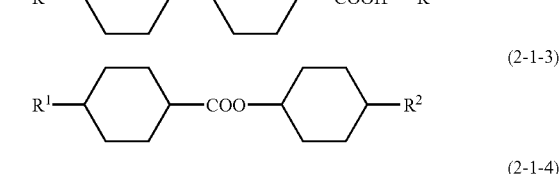
(2-1-3) 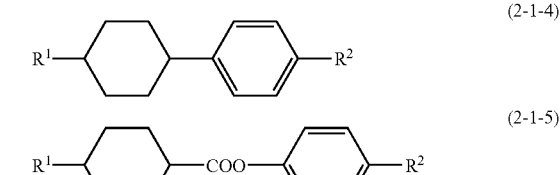
(2-1-4) 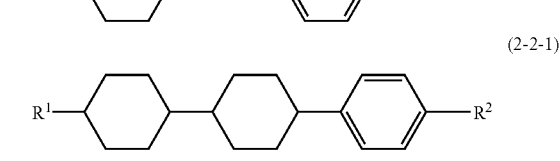

-continued
(2-2-2)
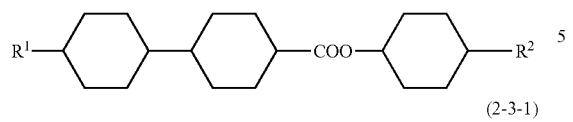
(2-3-1)
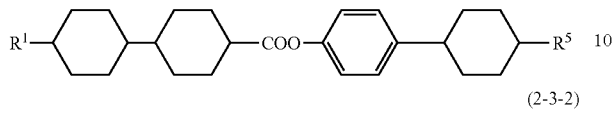
(2-3-2)
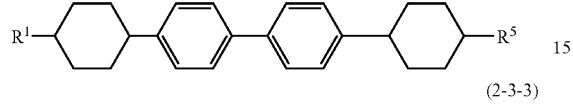
(2-3-3)
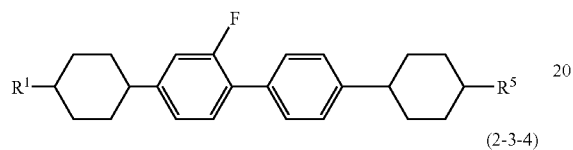
(2-3-4)
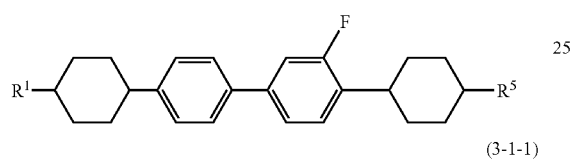
(3-1-1)
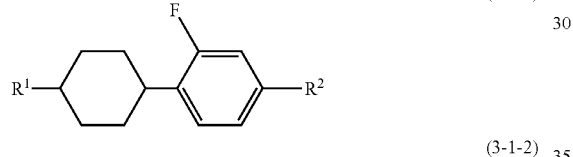
(3-1-2)
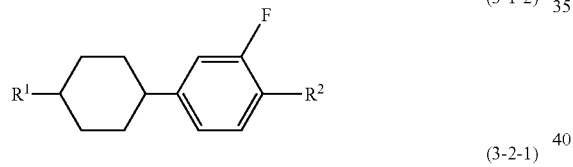
(3-2-1)
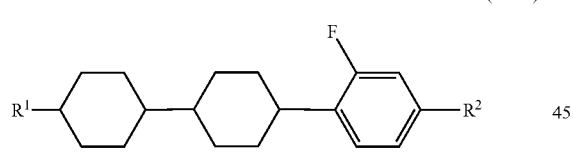
(3-2-2)
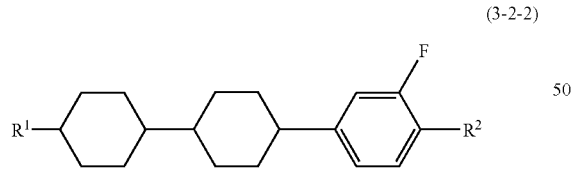
(3-2-3)
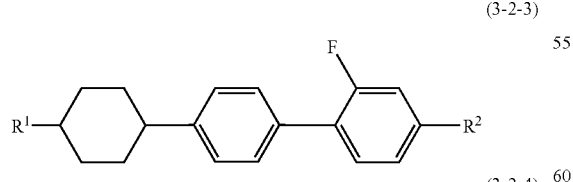
(3-2-4)
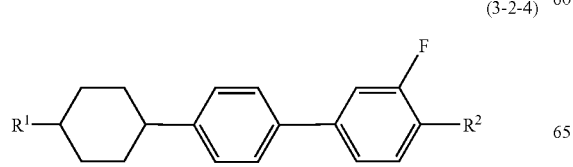
-continued
(3-3-1)
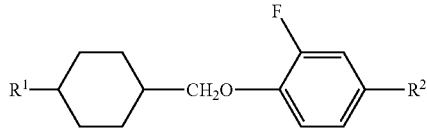
(3-3-2)
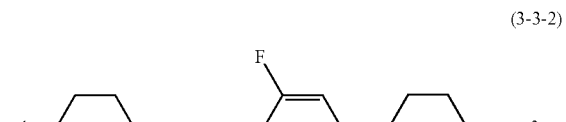
(3-3-3)
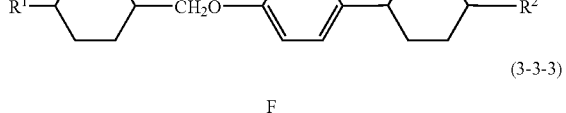
(3-4-1)
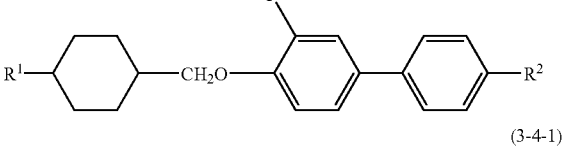
(3-4-2)
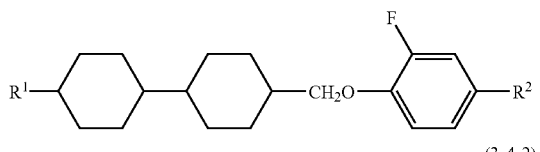
(4-1)
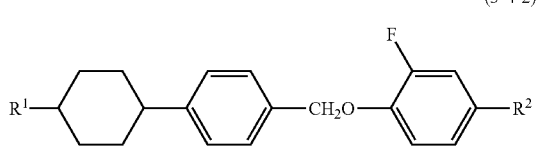
(4-2)
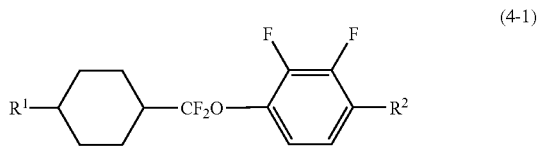
(4-3)
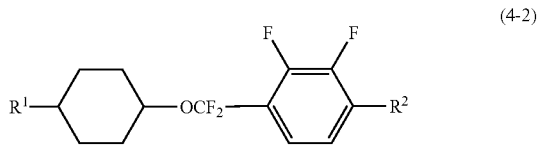
(4-4)
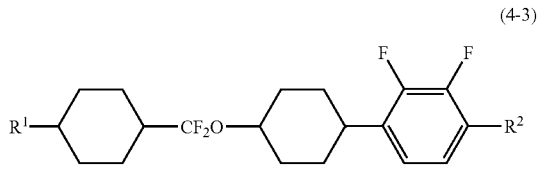
(4-5)
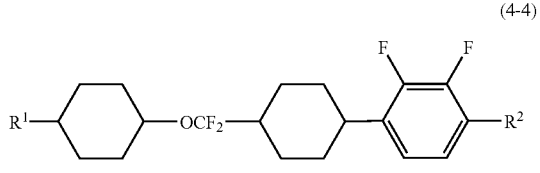
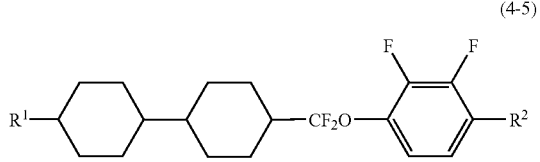

-continued
(4-6)
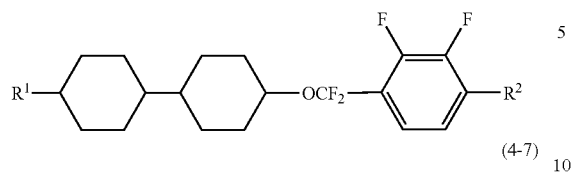
(4-7)
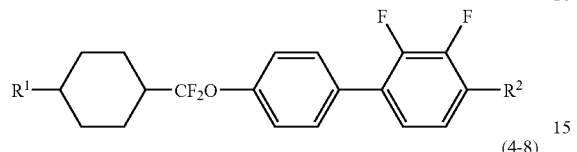
(4-8)
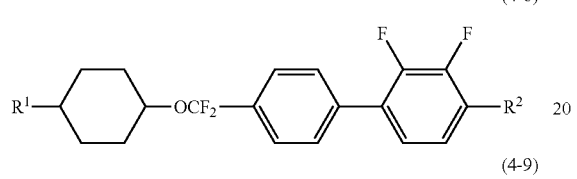
(4-9)
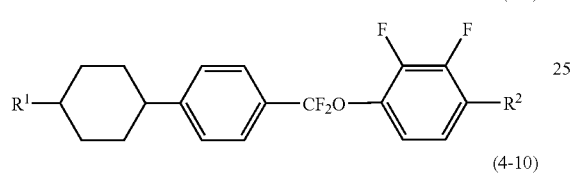
(4-10)
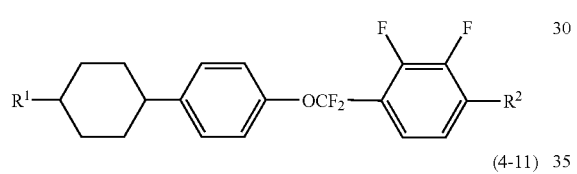
(4-11)
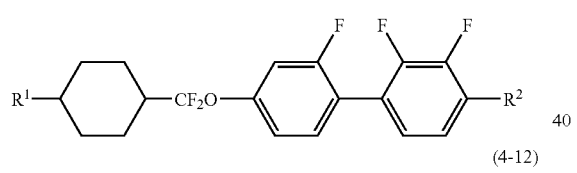
(4-12)
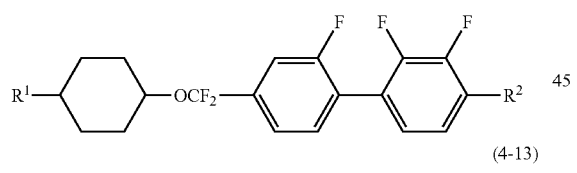
(4-13)
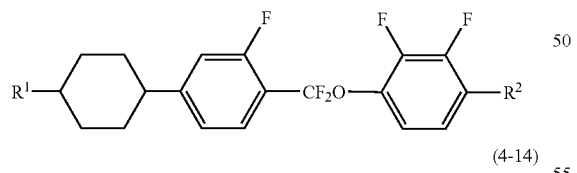
(4-14)
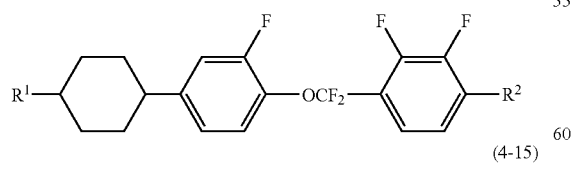
(4-15)
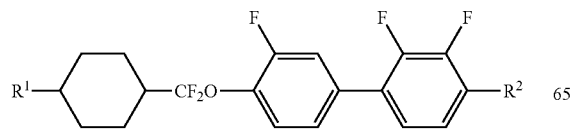
-continued
(4-16)
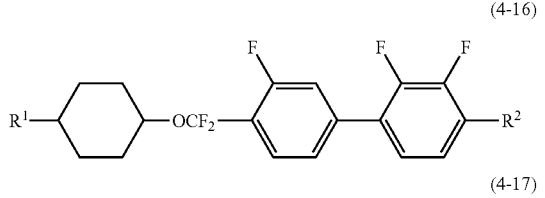
(4-17)
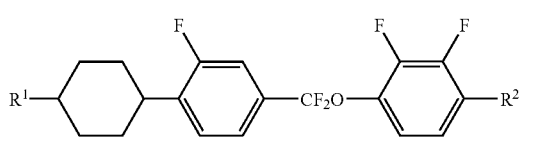
(4-18)
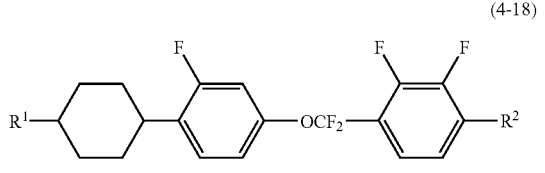
(4-19)
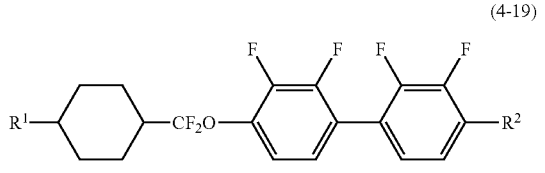
(4-20)
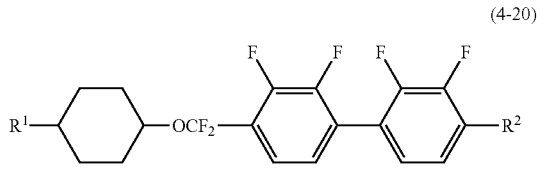
(4-21)
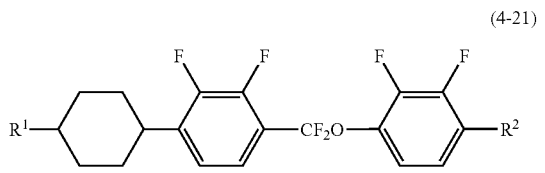
(4-22)
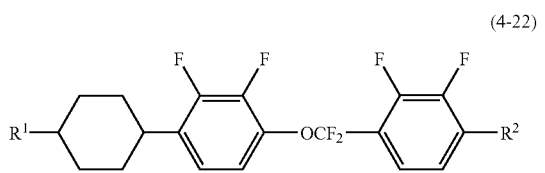
(4-23)
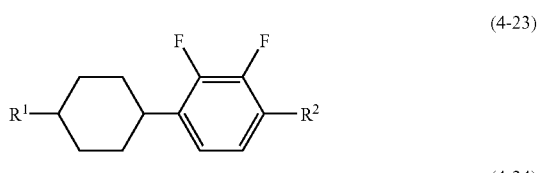
(4-24)
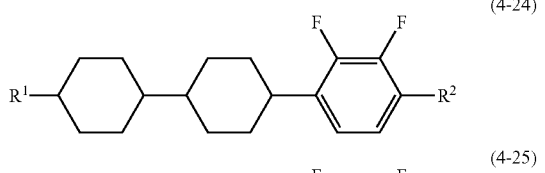
(4-25)
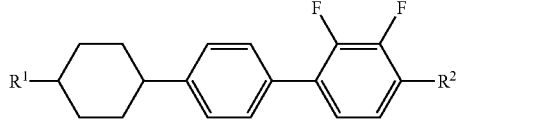

-continued

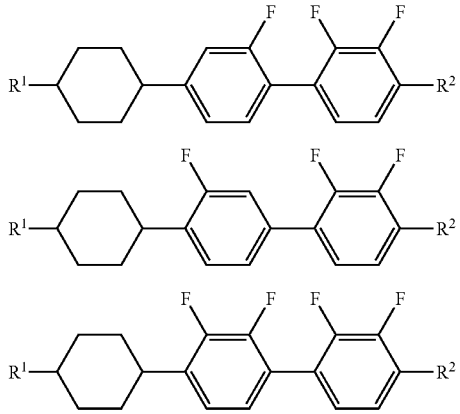

(4-26)

(4-27)

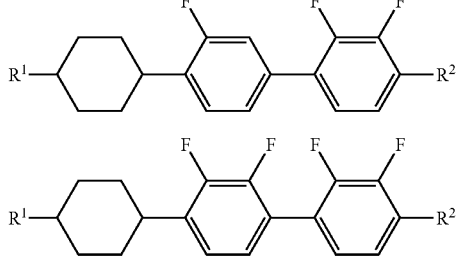

(4-28)

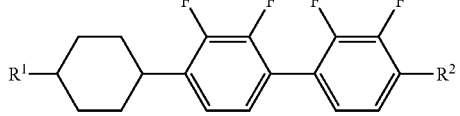

Sixth, the synthesis methods of the component compounds will be explained. The compounds can be synthesized by known methods. The synthesis methods will be exemplified. The compound (1) may be synthesized by modifying methods described in WO 2000-39063 A. The compound (2-1-1) may be synthesized by methods described in JP-A-59-70624 and JP-A-60-16940. The compound (4) may be synthesized by modifying methods described in JP-A-6-228037.

The compounds where their synthesis methods were not described above may be synthesized according to methods described in *Organic Synthesis* (John Wiley & Sons, Inc.), *Organic Reactions* (John Wiley & Sons, Inc.), *Comprehensive Organic Synthesis* (Pergamon Press), *Shin Jikken Kagaku Kouza* (New Experimental Chemistry Course, Maruzen, Inc.), and so forth. The composition is prepared from thus-obtained compounds according to known methods. For example, the component compounds are mixed and dissolved in each other by heating to prepare the composition.

The composition of the invention generally has an optical anisotropy of 0.05 to 0.11 and a dielectric anisotropy of −6.5 to −2.0. The dielectric anisotropy is preferably within the range of −5.0 to −2.5. By controlling the ratio of the component compounds or by mixing another compound, a composition having an optical anisotropy of 0.05 to 0.18 may be prepared, and further a composition having an optical anisotropy of 0.05 to 0.20 may be prepared. Thus, the composition is suitable for an AM element of a VA mode, an IPS mode, etc., and particularly suitable for an AM element of a VA mode.

In elements of a TN mode, a VA mode, etc., the electric field direction is perpendicular to the normal direction of a substrate. In elements of an IPS mode, etc., the electric field direction is parallel to the normal direction of a substrate. A structure of an element having a VA mode has been reported in K. Ohmuro, S. Kataoka, T. Sasaki, and Y. Koike, *SID 97 Digest of Technical Papers*, 28, 845 (1997). A structure of an element having an IPS mode has been reported in WO 1991-10936 A (U.S. Pat. No. 5,576,867). The composition of the invention is suitable also for these elements.

The composition can be used not only for an AM element but also for a PM element. The composition can be used for elements having a PC, TN, STN, or OCB mode, and so forth. These elements may be a reflection type, a transmission type, or a semi-transmission type. The composition is also usable for a nematic curvilinear aligned phase (NCAP) element produced by microencapsulation, and for a polymer dispersed (PD) element such as a polymer network (PN) element, which has a three-dimensional polymer network in the composition.

EXAMPLES

The present invention will be explained in detail with reference to Examples without intention of restricting the scope of the invention. Compounds used in Examples are expressed by symbols according to definition shown in Table 8. In Table 8, 1,4-cyclohexylene has trans configuration. In Examples, parenthesized numbers next to the symbols correspond to the numbers of the preferred compounds. The symbol (−) means another compound. The content (percentage) of each compound is shown in percentage by weight (% by weight) based on the total weight of the composition. Finally the characteristics of the composition are summarized.

TABLE 8

| Method for Description of Compounds using symbols<br>R—(A$_1$)—Z$_1$—...—Z$_n$-(A$_n$)—X | |
|---|---|
|  | Symbol |
| 1) Left terminal group R— |  |
| C$_n$H$_{2n+1}$— | n- |
| CH$_2$=CH— | V- |
| C$_n$H$_{2n+1}$CH=CH— | nV- |
| 2) Ring structure —(A$_n$)— |  |
| 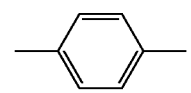 | B |
| 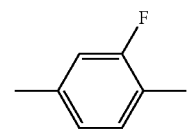 | B(3F) |
| 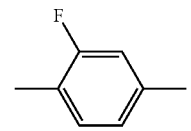 | B(2F) |
| 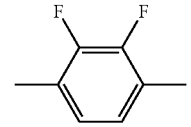 | B(2F,3F) |
|  | B(2CF$_2$H,3F) |
| 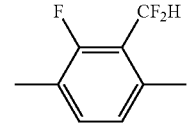 | B(2F,3CF$_2$H) |
| 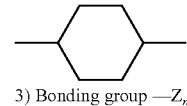 | H |
| 3) Bonding group —Z$_n$— |  |
| —COO— | E |

TABLE 8-continued

Method for Description of Compounds using symbols
R—(A₁)—Z₁—...—Zₙ-(Aₙ)—X

| | Symbol |
|---|---|
| —CF₂O— | CF2O |
| —OCF₂— | OCF2 |
| —CF₂OC₂H₄— | CF2O2 |
| —OCF₂C₂H₄— | OCF22 |

5) Example of Description

Example 1. 3-HH1OB(2CF₂H,3F)—O2

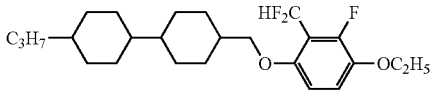

Example 2. 3-HHB(2F,3CF₂H)—O2

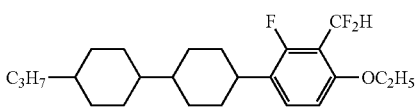

Example 3. 3-HBB(2F)—O2

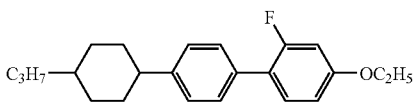

The composition is prepared by measuring the weights of components such as liquid crystalline compounds, and then mixing the components. Thus, the content (% by weight) of each component can be easily calculated. It is not easy to precisely calculate the content of each component by gas chromatograph analysis of the composition, because correction factor depend on the type of the liquid crystalline compound. In the invention, fortunately the correction factors are approximately 1. Further, difference of 1% by weight between the component compounds has only a small effect on the characteristics of the composition. Thus, in the invention, the area ratio of each component peak obtained in the gas chromatograph can be considered as the content (% by weight) of the component. Accordingly, the results of the gas chromatograph analysis (the area ratios of the peaks) may be regarded as being equivalent to the contents of the components without correction.

When a sample was a composition, it was measured without modification, and the value was described. When a sample was a compound, 15% by weight of the compound was mixed with 85% by weight of a liquid crystal matrix and then subjected to the measurement. The characteristic values of the compound were calculated from the measured values by an extrapolation method using an extrapolation value of (measured value of sample −0.85×measured value of liquid crystal matrix)/0.15. When a smectic phase (or a crystal) was generated at this mixing ratio at 25° C., the mixing ratio of the compound to the liquid crystal matrix was changed to 10:90, 5:95, and 1:99% by weight, in this order. The higher limit temperature, the optical anisotropy, the viscosity, and the dielectric anisotropy of the compound were obtained by the extrapolation method.

The liquid crystal matrix had the following composition.

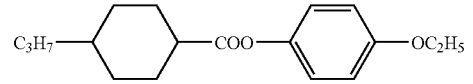 17.2%

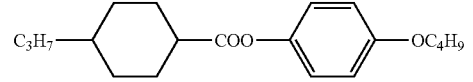 27.6%

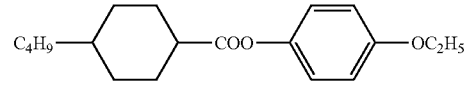 20.7%

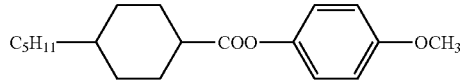 20.7%

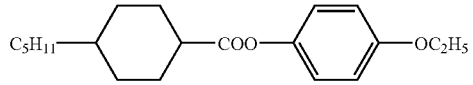 13.8%

Characteristic values were measured by the methods to be described below. Most of the methods are those described in EIAJ ED-2521A of Standard of Electric Industries Association of Japan or modification thereof. TN elements used in the measurement were not equipped with a TFT.

Higher limit temperature of nematic phase temperature range (NI; ° C.): A sample was placed on a hot plate of a melting point apparatus equipped with a polarizing microscope, and was heated at the rate of 1° C./minute to measure a temperature, at which a part of the sample began to change from the nematic phase into an isotropic liquid. The higher limit temperature of the nematic phase temperature range may be abbreviated to "the higher limit temperature."

Lower limit temperature of nematic phase temperature range ($T_C$; ° C.): A sample having a nematic phase was put in a glass bottle and stored in a freezer at 0° C., −10° C., −20° C., −30° C., or −40° C. for 10 days, and the liquid crystal phase was observed. For example, when the sample maintained the nematic phase at −20° C. and changed to a crystal or smectic phase at −30° C., the lower limit temperature of the nematic phase was expressed as $T_C \leq -20°$ C. The lower limit temperature of the nematic phase temperature range may be abbreviated to "the lower limit temperature."

Viscosity (η; at 20° C.; mPa·s): An E-type rotational viscometer was used in the measurement.

Rotational viscosity (γ1; at 25° C.; mPa·s): A rotational viscosity was measured according to a method described in M. Imai, et al., *Molecular Crystals and Liquid Crystals*, Vol. 259, 37 (1995). A sample was introduced into a VA element having two glass plates at an interval (cell gap) of 20 μm. A voltage of 30 to 50 V was applied to the element while changing the voltage stepwise by 1 V. The element was left under no applied voltage for 0.2 seconds, and then the voltage application was repeated such that only one rectangular wave (rectangular pulse) was applied for 0.2 seconds and no voltage was applied for 2 seconds. A transient current generated by the application was measured with respect to the peak current and the peak time. The rotational viscosity of the sample was calculated from the measured values by a computational expression (8) described in M. Imai, et al., *ibid.*, Page 40. A dielectric anisotropy measured by the following method was used for the calculation.

Optical anisotropy (refractive anisotropy; Δn; at 25° C.): A light with a wavelength of 589 nm, and an Abbe refractometer having an eyepiece equipped with a polarizing plate were used in the measurement. A surface of the main prism was rubbed in one direction, and then a sample was put on the main prism dropwise. A refractive index n∥ was measured when the polarization direction was parallel to the rubbing direction. A refractive index n⊥ was measured when the polarization direction was perpendicular to the rubbing direction. The optical anisotropy of the sample was calculated using the equation of Δn=n∥−n⊥.

Dielectric anisotropy (Δε; at 25° C.): A sample was introduced into a VA element having two glass plates at an interval (cell gap) of 20 μm. A sine wave (0.5 V, 1 kHz) was applied to the element, and a dielectric constant (ε∥) in the longitudinal direction of the liquid crystal molecules was measured 2 seconds after the beginning of the application. A sample was introduced into a TN element, which had two glass plates at an interval (cell gap) of 9 μm, and had a twist angle of 80 degrees. A sine wave (0.5 V, 1 kHz) was applied to the element, and a dielectric constant (ε⊥) in the lateral direction of the liquid crystal molecules was measured 2 seconds after the beginning of the application. The dielectric anisotropy was calculated using the equation of Δε=ε∥−ε⊥.

Threshold voltage (Vth; at 25° C.; V): LCD5100 luminance meter manufactured by Otsuka Electronics Co., Ltd. was used in the measurement. A halogen lamp was used as a light source. A sample was introduced into a TN element of a normally white mode, which had two glass plates at an interval (cell gap) of 5.0 μm, and had a twist angle of 80 degrees. A voltage (32 Hz, rectangular wave) was applied to the element while increasing the voltage from 0 V to 10 V stepwise by 0.02 V. The element was irradiated with a light from the vertical direction, and the quantity of the light transmitted through the element was measured. The transmittance was considered as 100% when the light quantity was the maximum value, the transmittance was considered as 0% when the light quantity was the minimum value, and thus a voltage-transmittance curve was obtained. The threshold voltage is a voltage at which the transmittance was 90%.

Voltage holding ratio (VHR; at 25° C. and 100° C.; %): A TN element used for the measurement had a polyimide alignment film and had two glass plates at an interval (cell gap) of 6 μm. A sample was introduced into the element, and the element was sealed with an ultraviolet polymerization type adhesive. A pulse voltage (5V, 60 microseconds) was applied to the TN element to charge the element. The voltage decay was measured for 16.7 milliseconds by a fast voltmeter, to obtain an area A between a voltage curve and a horizontal axis in a unit period. Also an area B was obtained when the voltage was not decayed. A voltage holding ratio is the percentage of the area A to the area B. A voltage holding ratio measured at 25° C. was expressed as VHR-1, and a voltage holding ratio measured at 100° C. was expressed as VHR-2. Then, the TN element was heated at 100° C. for 250 hours. A voltage holding ratio of the heated element measured at 25° C. was expressed as VHR-3, and a voltage holding ratio of the heated element measured at 100° C. was expressed as VHR-4. VHR-1 and VHR-2 corresponded to initial characteristics, and VHR-3 and VHR-4 corresponded to characteristics shown after the element had been used for a long time.

Response time (τ; at 25° C.; millisecond): LCD5100 luminance meter manufactured by Otsuka Electronics Co., Ltd. was used in the measurement. A halogen lamp was used as a light source, and a low-pass filter was set at 5 kHz. A sample was introduced into a TN element of a normally white mode, which had two glass plates at an interval (cell gap) of 5.0 μm, and had a twist angle of 80 degrees. A rectangular wave (60 Hz, 5 V, 0.5 seconds) was applied to the element. The element was irradiated with a light from the vertical direction, and the quantity of the light transmitted through the element was measured. The transmittance was considered as 100% when the light quantity was the maximum value, and the transmittance was considered as 0% when the light quantity was the minimum value. A rise time (τr) was obtained as a time required for changing the transmittance from 90% to 10%, and a fall time (τf) was obtained as a time required for changing the transmittance from 10% to 90%. A response time is the sum of thus-obtained rise time and fall time.

Gas chromatograph analysis: GC-14B gas chromatograph manufactured by Shimadzu Corporation was used in the measurement. Helium was used at the rate of 2 ml/minute as a carrier gas. The temperature of a sample vaporizing chamber was set at 280° C., and the temperature of a detector (FID) was set at 300° C. Capillary column DB-1 available from Agilent Technologies Inc. (length 30 m, inner diameter 0.32 mm, film thickness 0.25 μm, dimethylpolysiloxane stationary liquid phase, nonpolar) was used for separating component compounds. The column was kept at 200° C. for 2 minutes, and then heated to 280° C. at the rate of 5° C./minute. A sample was prepared in the form of a 0.1% by weight acetone solution, and 1 μl thereof was introduced into the sample vaporizing chamber. Used as a recorder was C-R5A Chromatopac manufactured by Shimadzu Corporation or an equivalent thereof. The obtained gas chromatogram showed the retention times and the areas of peaks corresponding to the component compounds.

Chloroform, hexane, and so forth may be used as a solvent for diluting the sample. The component compounds may be separated by using a capillary column such as HP-1 available from Agilent Technologies Inc. (length 30 m, inner diameter 0.32 mm, film thickness 0.25 μm), Rtx-1 available from Restek Corporation (length 30 m, inner diameter 0.32 mm, film thickness 0.25 μm), and BP-1 available from SGE International Pty. Ltd. (length 30 m, inner diameter 0.32 mm, film thickness 0.25 μm). A capillary column CBP1-M50-025 available from Shimadzu Corporation (length 50 m, inner diameter 0.25 mm, film thickness 0.25 μm) may be used to prevent overlapping of the compound peaks. The area ratio of the peaks in the gas chromatogram corresponds to the ratio of the component compounds. The content (% by weight) of each component compound is not completely equal to the area ratio of each peak. However, when the above capillary columns are used in the invention, the content of the component compound can be regarded as being equal to the area ratio of the peak because the correction factors of the component compounds have no great differences.

Example 1

| | | |
|---|---|---|
| 3-HB(2F,3CF$_2$H)—O2 | (1-1-1) | 3% |
| 5-HB(2F,3CF$_2$H)—O2 | (1-1-1) | 3% |
| 2-HH1OB(2CF$_2$H,3F)—O2 | (1-7-1) | 12% |
| 3-HH1OB(2CF$_2$H,3F)—O2 | (1-7-1) | 12% |
| 5-HH1OB(2CF$_2$H,3F)—O2 | (1-7-1) | 12% |
| 2-HH-5 | (2-1-1) | 8% |
| 3-HH-4 | (2-1-1) | 10% |
| 3-HH-5 | (2-1-1) | 10% |
| 3-HB—O2 | (2-1-4) | 10% |
| 5-HB—O2 | (2-1-4) | 10% |
| 3-HHB-1 | (2-2-1) | 10% |

NI=70.7° C.; Tc<−20° C.; Δn=0.071; Δε=−3.9; η=38.4 mPa·s.

Example 2

| | | |
|---|---|---|
| 2-HHB(2F,3CF$_2$H)—O2 | (1-4-1) | 5% |
| 3-HHB(2F,3CF$_2$H)—O2 | (1-4-1) | 8% |
| 5-HHB(2F,3CF$_2$H)—O2 | (1-4-1) | 8% |
| 3-HH1OB(2CF$_2$H,3F)—O2 | (1-7-1) | 10% |
| 5-HH1OB(2CF$_2$H,3F)—O2 | (1-7-1) | 10% |
| 3-HH—V | (2-1-1) | 10% |
| 5-HH—V | (2-1-1) | 25% |
| 3-HH—V1 | (2-1-1) | 5% |
| 3-HB—O1 | (2-1-4) | 7% |
| 3-HB—O2 | (2-1-4) | 7% |
| 3-HBBH-4 | (2-3-2) | 5% |

NI=74.0° C.; Tc<−20° C.; Δn=0.066; Δε=−3.5; η=35.2 mPa·s.

Example 3

| | | |
|---|---|---|
| 5-HB(2F,3CF$_2$H)—O2 | (1-1-1) | 5% |
| 5-HB(2F,3CF$_2$H)—O4 | (1-1-1) | 3% |
| 2-HHB(2F,3CF$_2$H)—O2 | (1-4-1) | 10% |
| 3-HHB(2F,3CF$_2$H)—O2 | (1-4-1) | 12% |
| 5-HHB(2F,3CF$_2$H)—O2 | (1-4-1) | 12% |
| 5-HH—V | (2-1-1) | 24% |
| 3-HH—V1 | (2-1-1) | 5% |
| 3-HB—O2 | (2-1-4) | 6% |
| V-HHB-1 | (2-2-1) | 10% |
| V2-HHB-1 | (2-2-1) | 8% |
| 3-HBBH-1O1 | (2-3-2) | 5% |

NI=85.1° C.; Tc<−20° C.; Δn=0.074; Δε=−3.4; η=42.1 mPa·s.

Example 4

| | | |
|---|---|---|
| 3-HHB(2F,3CF$_2$H)—O2 | (1-4-1) | 10% |
| 5-HHB(2F,3CF$_2$H)—O2 | (1-4-1) | 10% |
| 2-HH1OB(2CF$_2$H,3F)—O2 | (1-7-1) | 10% |
| 3-HH1OB(2CF$_2$H,3F)—O2 | (1-7-1) | 10% |
| 3-HH—V | (2-1-1) | 12% |
| 5-HH—V | (2-1-1) | 25% |
| 3-HH—V1 | (2-1-1) | 5% |
| 3-HHB(2F,3F)—O2 | (4-24) | 10% |
| 3-HBB(2F,3F)—O2 | (4-25) | 8% |

NI=85.4° C.; Tc<−20° C.; Δn=0.068; Δε=−4.6; η=39.91 mPa·s.

Example 5

| | | |
|---|---|---|
| 2-HH1OB(2CF$_2$H,3F)—O2 | (1-7-1) | 5% |
| 3-HH1OB(2CF$_2$H,3F)—O2 | (1-7-1) | 10% |
| 5-HH1OB(2CF$_2$H,3F)—O2 | (1-7-1) | 10% |
| 3-HH-4 | (2-1-1) | 7% |
| 5-HB-3 | (2-1-4) | 3% |
| 7-HB-1 | (2-1-4) | 5% |
| 3-HHB-1 | (2-2-1) | 10% |
| 3-HHB-3 | (2-2-1) | 10% |
| 3-HHB—O1 | (2-2-1) | 10% |

-continued

| | | |
|---|---|---|
| 3-HB(2F,3F)—O2 | (4-23) | 5% |
| 3-HB(2F,3F)—O4 | (4-23) | 5% |
| 5-HB(2F,3F)—O2 | (4-23) | 10% |
| 5-HB(2F,3F)—O4 | (4-23) | 10% |

NI=80.2° C.; Tc<−20° C.; Δn=0.079; Δε=−3.7; η=37.1 mPa·s; VHR-1=99.2%.

Example 6

| | | |
|---|---|---|
| 3-HHB(2F,3CF$_2$H)—O2 | (1-4-1) | 7% |
| 5-HHB(2F,3CF$_2$H)—O2 | (1-4-1) | 7% |
| 2-HH-5 | (2-1-1) | 5% |
| 3-HH-4 | (2-1-1) | 15% |
| 3-HH-5 | (2-1-1) | 8% |
| 3-HHB-1 | (2-2-1) | 5% |
| 3-HHB-3 | (2-2-1) | 5% |
| 3-HHB—O1 | (2-2-1) | 3% |
| 3-HBBH-4 | (2-3-2) | 5% |
| 3-HB(2F,3F)—O2 | (4-23) | 10% |
| 3-HB(2F,3F)—O4 | (4-23) | 10% |
| 3-HHB(2F,3F)—O2 | (4-24) | 5% |
| 3-HBB(2F,3F)—O2 | (4-25) | 5% |
| 3-HB(3F)B(2F,3F)—O2 | (4-26) | 5% |
| 3-HB(2F)B(2F,3F)—O2 | (4-27) | 5% |

NI=90.9° C.; Tc<−20° C.; Δn=0.083; Δε=−3.9; η=32.5 mPa·s.

Example 7

| | | |
|---|---|---|
| 2-HH1OB(2CF$_2$H,3F)—O2 | (1-7-1) | 8% |
| 3-HH1OB(2CF$_2$H,3F)—O2 | (1-7-1) | 8% |
| 5-HH1OB(2CF$_2$H,3F)—O2 | (1-7-1) | 8% |
| 3-HB(2F)-3 | (3-1-1) | 7% |
| 3-HB(2F)—O2 | (3-1-1) | 7% |
| 3-HB(3F)-3 | (3-1-2) | 7% |
| 3-HB(3F)—O2 | (3-1-2) | 7% |
| 3-H1OB(2F)-3 | (3-3-1) | 5% |
| 3-H1OB(2F)—O2 | (3-3-1) | 5% |
| 3-H1OB(2F)H-3 | (3-3-2) | 7% |
| 3-H1OB(2F)H—O2 | (3-3-2) | 7% |
| 3-H1OB(2F)B-3 | (3-3-3) | 7% |
| 3-H1OB(2F)B—O2 | (3-3-3) | 7% |
| 3-HH1OB(2F)—O2 | (3-4-1) | 5% |
| 3-HH1OB(2F)-1 | (3-4-1) | 5% |

NI=70.1° C.; Tc<−20° C.; Δn=0.098; Δε=−4.0; η=43.3 mPa·s; VHR-1=99.6%.

Example 8

| | | |
|---|---|---|
| 3-HB(2F,3CF$_2$H)—O4 | (1-1-1) | 5% |
| 3-HHB(2F,3CF$_2$H)—O2 | (1-4-1) | 5% |
| 5-HHB(2F,3CF$_2$H)—O2 | (1-4-1) | 5% |
| 2-HH1OB(2CF$_2$H,3F)—O2 | (1-7-1) | 3% |
| 3-HH1OB(2CF$_2$H,3F)—O2 | (1-7-1) | 10% |
| 5-HH1OB(2CF$_2$H,3F)—O2 | (1-7-1) | 10% |
| 3-HB(2F)-3 | (3-1-1) | 10% |
| 3-HB(3F)-3 | (3-1-2) | 7% |
| 3-HB(3F)—O2 | (3-1-2) | 8% |

-continued

| | | |
|---|---|---|
| 3-HHB(2F)—O2 | (3-2-1) | 5% |
| 3-HHB(2F)-1 | (3-2-1) | 5% |
| 3-HHB(3F)—O2 | (3-2-2) | 7% |
| 3-HHB(3F)-1 | (3-2-2) | 5% |
| 3-H1OB(2F)H—O2 | (3-3-2) | 5% |
| 3-H1OB(2F)B—O2 | (3-3-3) | 5% |
| 3-HH1OB(2F)—O2 | (3-4-1) | 5% |

NI=81.2° C.; Δn=0.089; Δε=−4.8; η=49.7 mPa·s.

Example 9

| | | |
|---|---|---|
| 5-HHB(2F,3CF$_2$H)—O2 | (1-4-1) | 4% |
| 2-HH1OB(2CF$_2$H,3F)—O2 | (1-7-1) | 3% |
| 3-HH1OB(2CF$_2$H,3F)—O2 | (1-7-1) | 10% |
| 5-HH1OB(2CF$_2$H,3F)—O2 | (1-7-1) | 10% |
| 3-HB(2F)—O2 | (3-1-1) | 9% |
| 3-HB(3F)—O2 | (3-1-2) | 9% |
| 3-HHB(2F)-1 | (3-2-1) | 8% |
| 3-HHB(3F)—O2 | (3-2-2) | 6% |
| 3-HHB(3F)-1 | (3-2-2) | 6% |
| 3-HBB(2F)—O2 | (3-2-3) | 6% |
| 3-HBB(2F)-1 | (3-2-3) | 5% |
| 5-HB(2F,3F)—O2 | (4-23) | 8% |
| 5-HB(2F,3F)—O4 | (4-23) | 8% |
| 3-HBB(2F,3F)—O2 | (4-25) | 8% |

NI=86.7° C.; Δn=0.099; Δε=−4.9; η=43.9 mPa·s.

Example 10

| | | |
|---|---|---|
| 3-HH1OB(2CF$_2$H,3F)—O2 | (1-7-1) | 8% |
| 5-HH1OB(2CF$_2$H,3F)—O2 | (1-7-1) | 8% |
| 3-H1OB(2F)-3 | (3-3-1) | 6% |
| 3-H1OB(2F)—O2 | (3-3-1) | 7% |
| 3-H1OB(2F)H-3 | (3-3-2) | 7% |
| 3-H1OB(2F)H—O2 | (3-3-2) | 7% |
| 3-HH1OB(2F)—O2 | (3-4-1) | 5% |
| 3-HH1OB(2F)-1 | (3-4-1) | 5% |
| 3-HB1OB(2F)—O2 | (3-4-2) | 5% |
| 3-HB1OB(2F)-1 | (3-4-2) | 5% |
| 3-HB(2F,3F)—O2 | (4-23) | 5% |
| 3-HB(2F,3F)—O4 | (4-23) | 5% |
| 5-HB(2F,3F)—O2 | (4-23) | 6% |
| 5-HB(2F,3F)—O4 | (4-23) | 6% |
| 3-HHB(2F,3F)—O2 | (4-24) | 10% |
| 3-HBB(2F,3F)—O2 | (4-25) | 5% |

NI=79.8° C.; Δn=0.093; Δε=−4.3; η=41.7 mPa·s.

Example 11

| | | |
|---|---|---|
| 5-HB(2F,3CF$_2$H)—O2 | (1-1-1) | 5% |
| 5-HB(2F,3CF$_2$H)—O4 | (1-1-1) | 3% |
| 2-HHB(2F,3CF$_2$H)—O2 | (1-4-1) | 10% |
| 3-HHB(2F,3CF$_2$H)—O2 | (1-4-1) | 12% |
| 5-HHB(2F,3CF$_2$H)—O2 | (1-4-1) | 12% |
| 5-HH—V | (2-1-1) | 24% |
| 3-HH—V1 | (2-1-1) | 5% |
| 3-HB—O2 | (2-1-4) | 6% |
| V-HHB-1 | (2-2-1) | 10% |

-continued

| | | |
|---|---|---|
| V2-HHB-1 | (2-2-1) | 8% |
| 1O1-HBBH—O1 | (—) | 5% |

NI=86.6° C.; Tc<−20° C.; Δn=0.074; Δε=−3.4; η=42.6 mPa·s.

What is claimed is:

1. A liquid crystal composition with a negative dielectric anisotropy, comprising at least one compound selected from the group of compounds represented by the following formula (1) as a first component, and at least one compound selected from the group of compounds represented by the following formulas (2-1) to (2-3) and (3-1) to (3-4) as a second component:

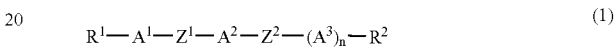  (1)

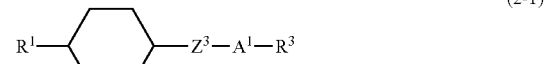  (2-1)

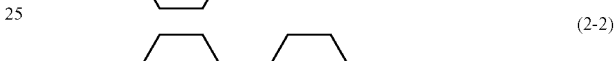  (2-2)

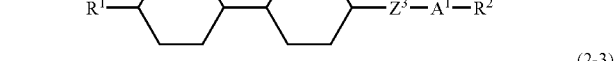  (2-3)

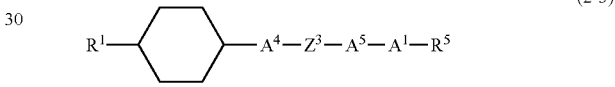  (3-1)

  (3-2)

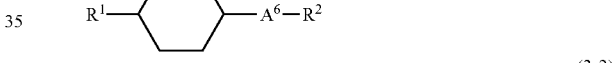  (3-3)

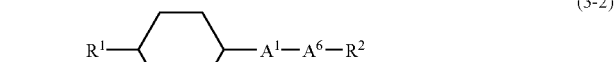  (3-4)

wherein $R^1$ is alkyl or alkenyl; $R^2$ is alkyl, alkenyl, or alkoxy; $R^3$ is alkyl, alkenyl, alkoxy, or —COO—$R^4$, in which $R^4$ is alkyl; $R^5$ is alkyl, alkenyl, alkoxy, or alkoxymethyl; $Z^1$ and $Z^2$ are independently a single bond, —CH$_2$O—, —OCH$_2$—, —(CH$_2$)$_2$—, —(CH$_2$)$_4$—, —CF$_2$O—, —OCF$_2$—, —C$_2$H$_4$CF$_2$O—, —C$_2$H$_4$OCF$_2$—, —CF$_2$OC$_2$H$_4$—, or —OCF$_2$C$_4$—; $Z^3$ is a single bond or —COO—; $A^1$ is 1,4-cyclohexylene or 1,4-phenylene; $A^2$ and $A^3$ are independently 1,4-cyclohexylene, 1,4-phenylene, 1,4-phenylene in which any hydrogen may be replaced by fluorine, or 2-difluoromethyl-3-fluoro-1,4-phenylene; $A^4$ is 1,4-cyclohexylene, 1,4-phenylene, or 1,4-phenylene in which a hydrogen is replaced by a fluorine; $A^5$ is 1,4-phenylene or 1,4-phenylene in which a hydrogen is replaced by a fluorine; $A^6$ is 2-fluoro-1,4-phenylene; n is 0 or 1; in the formula (1), when n is 0, $A^2$ is 2-difluoromethyl-3-fluoro-1,4-phenylene, and $Z^2$ is a single bond; and in the formula (1), when n is 1, one of $A^2$ and $A^3$ is 2-difluoromethyl-3-fluoro-1,4-phenylene, and one of $Z^1$ and $Z^2$ is a single bond, wherein the first component is at least one compound selected from the group of compounds represented by the following formulas (1-1) to (1-12):

$$R^1\text{-}A^1\text{-}Z^4\text{-}A^7\text{-}(A^8)_n\text{-}R^2 \quad (1\text{-}1)$$

$$R^1\text{-}A^1\text{-}Z^5\text{-}A^7\text{-}(A^8)_n\text{-}R^2 \quad (1\text{-}2)$$

$$R^1\text{-}A^1\text{-}Z^6\text{-}A^7\text{-}(A^8)_n\text{-}R^2 \quad (1\text{-}3)$$

$$R^1\text{-}A^1\text{-}Z^4\text{-}A^8\text{-}A^7\text{-}R^2 \quad (1\text{-}4)$$

$$R^1\text{-}A^1\text{-}Z^5\text{-}A^8\text{-}A^7\text{-}R^2 \quad (1\text{-}5)$$

$$R^1\text{-}A^1\text{-}Z^6\text{-}A^8\text{-}A^7\text{-}R^2 \quad (1\text{-}6)$$

$$R^1\text{-}A^1\text{-}A^8\text{-}Z^4\text{-}A^7\text{-}R^2 \quad (1\text{-}7)$$

$$R^1\text{-}A^1\text{-}A^8\text{-}Z^5\text{-}A^7\text{-}R^2 \quad (1\text{-}8)$$

$$R^1\text{-}A^1\text{-}A^8\text{-}Z^6\text{-}A^7\text{-}R^2 \quad (1\text{-}9)$$

$$R^1\text{-}A^1\text{-}A^7\text{-}Z^4\text{-}A^8\text{-}R^2 \quad (1\text{-}10)$$

$$R^1\text{-}A^1\text{-}A^7\text{-}Z^5\text{-}A^8\text{-}R^2 \quad (1\text{-}11)$$

$$R^1\text{-}A^1\text{-}A^7\text{-}Z^6\text{-}A^8\text{-}R^2 \quad (1\text{-}12)$$

wherein $R^1$ is alkyl or alkenyl; $R^2$ is alkyl, alkenyl, or alkoxy; $Z^4$ is a single bond, —CH$_2$O—, or —OCH$_2$—; $Z^5$ is —(CH$_2$)$_2$— or —(CH$_2$)$_4$—; $Z^6$ is —CF$_2$O—, —OCF$_2$—, —C$_2$H$_4$CF$_2$O—, —C$_2$H$_4$OCF$_2$—, —CF$^2$OC$_2$H$_4$—, or —OCF$_2$C$_2$H$_4$—; $A^1$ is 1,4-cyclohexylene or 1,4-phenylene; $A^7$ is 1,4-phenylene in which a hydrogen is replaced by a fluorine, or 2-difluoromethyl-3-fluoro-1,4-phenylene; $A^8$ is 1,4-cyclohexylene, 1,4-phenylene, 1,4-phenylene in which a hydrogen is replaced by a fluorine, or 2-difluoromethyl-3-fluoro-1,4-phenylene; one of $A^7$ and $A^8$ is 2-difluoromethyl-3-fluoro-1,4-phenylene; n is 0 or 1; and in the formulas (1-1) to (1-3), when n is 0, $A^7$ is 2-difluoromethyl-3-fluoro-1,4-phenylene, and wherein, in the formula (1-1), $Z^4$ is a single bond, $A^1$ is 1,4-cyclohexylene, $A^7$ is 2-difluoromethyl-3-fluoro-1,4-phenylene, and n is 0.

2. The liquid crystal composition according to claim 1, wherein, in the formulas (1-4), (1-7), and (1-10), $Z^4$ is a single bond or —CH$_2$O—, $A^1$ and $A^8$ are 1,4-cyclohexylene, and $A^7$ is 2-difluoromethyl-3-fluoro-1,4-phenylene.

3. The liquid crystal composition according to claim 1, wherein the second component is at least one compound selected from the group of the compounds represented by the formulas (2-1) to (2-3).

4. The liquid crystal composition according to claim 1, wherein the second component is at least one compound selected from the group of the compounds represented by the formulas (2-1) to (2-3).

5. The liquid crystal composition according to claim 1, wherein the second component is at least one compound selected from the group of the compounds represented by the formula (2-1).

6. The liquid crystal composition according to claim 1, wherein the second component is at least one compound selected from the group of the compounds represented by the formula (2-1).

7. The liquid crystal composition according to claim 1, wherein the second component is at least one compound selected from the group of the compounds represented by the formula (2-2).

8. The liquid crystal composition according to claim 1, wherein the second component is at least one compound selected from the group of the compounds represented by the formula (2-2).

9. The liquid crystal composition according to claim 1, wherein the second component is at least one compound selected from the group of the compounds represented by the formula (2-3).

10. The liquid crystal composition according to claim 1, wherein the second component is at least one compound selected from the group of the compounds represented by the formulas (3-1) to (3-4).

11. The liquid crystal composition according to claim 1, wherein the second component is at least one compound selected from the group of compounds represented by the following formulas (2-1-1), (2-1-2), (2-1-3), (2-1-4), (2-1-5), (2-2-1), (2-2-2), (2-3-1), (2-3-2), (2-3-3), and (2-3-4):

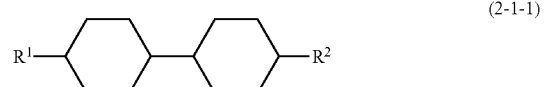
(2-1-1)

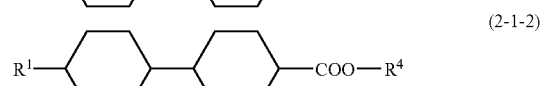
(2-1-2)

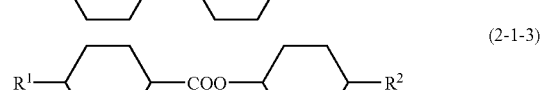
(2-1-3)

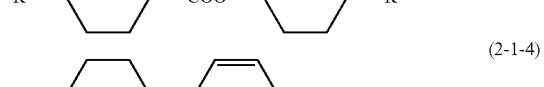
(2-1-4)

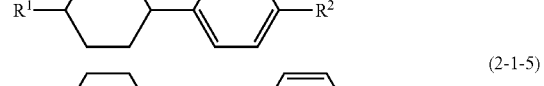
(2-1-5)

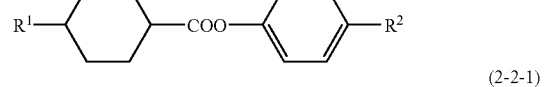
(2-2-1)

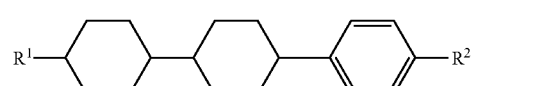
(2-2-2)

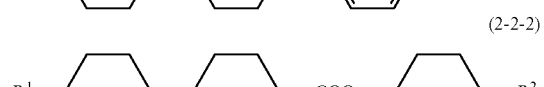
(2-3-1)

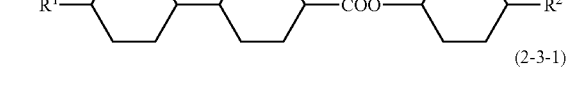
(2-3-2)

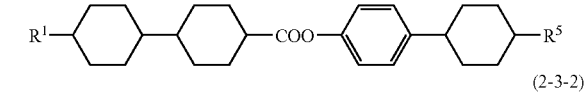
(2-3-3)

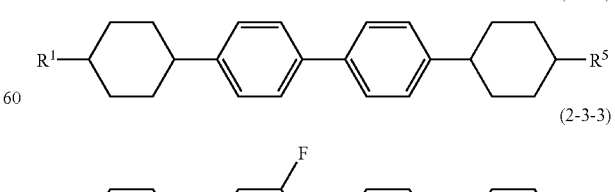

-continued (2-3-4)

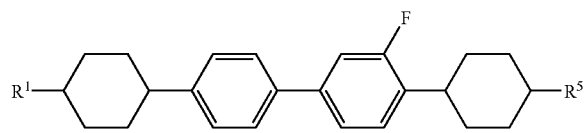

wherein $R^1$ is alkyl or alkenyl; $R^2$ is alkyl, alkenyl, or alkoxy; $R^4$ is alkyl; and $R^5$ is alkyl, alkenyl, alkoxy, or alkoxymethyl.

12. The liquid crystal composition according to claim 11, wherein the second component is a compound selected from the group of the compounds represented by the formulas (2-1-1), (2-1-4), (2-2-1), and (2-3-1).

13. The liquid crystal composition according to claim 1, wherein the liquid crystal composition comprises 5 to 90% by weight of the first component and 5 to 90% by weight of the second component based on the total weight of the composition.

14. The liquid crystal composition according to claim 12, wherein the liquid crystal composition comprises 5 to 90% by weight of the first component and 5 to 90% by weight of the second component based on the total weight of the composition.

15. The liquid crystal composition according to claim 1, further comprising at least one compound selected from the group of compounds represented by the following formula (4) as a third component:

(4)

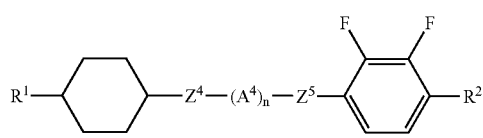

wherein $R^1$ is alkyl or alkenyl; $R^2$ is alkyl, alkenyl, or alkoxy; $Z^4$ and $Z^5$ are independently —CF$_2$O— or —OCF$_2$—; $A^4$ is 1,4-cyclohexylene, 1,4-phenylene, or 1,4-phenylene in which a hydrogen is replaced by a fluorine; and n is 0 or 1.

16. The liquid crystal composition according to claim 12, further comprising at least one compound selected from the group of compounds represented by the following formula (4) as a third component:

(4)

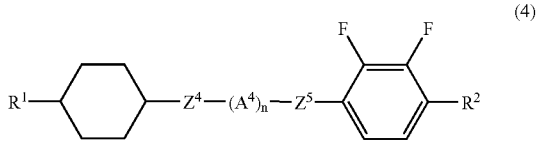

wherein $R^1$ is alkyl or alkenyl; $R^2$ is alkyl, alkenyl, or alkoxy; $Z^4$ and $Z^5$ are independently —CF$_2$O— or —OCF$_2$—; $A^4$ is 1,4-cyclohexylene, 1,4-phenylene, or 1,4-phenylene in which a hydrogen is replaced by a fluorine; and n is 0 or 1.

17. The liquid crystal composition according to claim 15, wherein the liquid crystal composition comprises 2 to 50% by weight of the third component based on the total weight of the composition.

18. The liquid crystal composition according to claim 16, wherein the liquid crystal composition comprises 2 to 50% by weight of the third component based on the total weight of the composition.

19. The liquid crystal composition according to claim 1, wherein the liquid crystal composition has a dielectric anisotropy of −6.5 to −2.0.

20. A liquid crystal display element comprising the liquid crystal composition according to claim 1.

21. A liquid crystal display element comprising the liquid crystal composition according to claim 12.

22. The liquid crystal display element according to claim 20, wherein the liquid crystal display element uses a VA or IPS mode, and is driven by an active matrix.

23. The liquid crystal display element according to claim 21, wherein the liquid crystal display element uses a VA or IPS mode, and is driven by an active matrix.

24. A method of using the liquid crystal composition according to claim 1 for a liquid crystal display element that uses a VA or IPS mode and is driven by an active matrix.

25. A method of using the liquid crystal composition according to claim 12 for a liquid crystal display element that uses a VA or IPS mode and is driven by an active matrix.

* * * * *